(12) United States Patent
Withey

(10) Patent No.: US 12,172,561 B2
(45) Date of Patent: Dec. 24, 2024

(54) SEATING APPARATUS

(71) Applicant: JAGUAR LAND ROVER LIMITED, Coventry (GB)

(72) Inventor: David Withey, Daventry (GB)

(73) Assignee: Jaguar Land Rover Limited, Warwickshire (GB)

( * ) Notice: Subject to any disclaimer, the term of this patent is extended or adjusted under 35 U.S.C. 154(b) by 0 days.

(21) Appl. No.: 18/375,969

(22) Filed: Oct. 2, 2023

(65) Prior Publication Data
US 2024/0025318 A1    Jan. 25, 2024

Related U.S. Application Data

(63) Continuation of application No. 17/632,054, filed as application No. PCT/EP2020/071501 on Jul. 30, 2020, now Pat. No. 11,772,534.

(30) Foreign Application Priority Data

Aug. 1, 2019 (GB) .................................... 1910978
Dec. 12, 2019 (GB) .................................... 1918263

(51) Int. Cl.
*B60N 2/70* (2006.01)
*B29C 44/12* (2006.01)
*B60N 2/52* (2006.01)
*B60N 2/90* (2018.01)
*B29K 105/04* (2006.01)
*B29L 31/00* (2006.01)

(52) U.S. Cl.
CPC ........ *B60N 2/7017* (2013.01); *B29C 44/1271* (2013.01); *B60N 2/52* (2013.01); *B60N 2/914* (2018.02); *B29K 2105/04* (2013.01); *B29L 2031/771* (2013.01)

(58) Field of Classification Search
CPC ........ B60N 2/7017; B60N 2/914; B60N 2/52; B60N 2/665; B60N 2/7082; B60N 2/62; B29C 2035/0855; B29C 71/02; B29C 44/1271; B29K 2105/04; B29L 2031/771
See application file for complete search history.

(56) References Cited

U.S. PATENT DOCUMENTS

| 4,589,695 | A | 5/1986 | Isono |
| 5,069,837 | A | 12/1991 | Sember, III |
| 5,975,629 | A | 11/1999 | Lorbiecki |
| 10,351,034 | B2 | 7/2019 | Schütze |

(Continued)

FOREIGN PATENT DOCUMENTS

WO    WO0003628    *    1/2000

OTHER PUBLICATIONS

International Search Report corresponding to International Application No. PCT/EP2020/071501, dated Nov. 12, 2020, 4 pages.

(Continued)

*Primary Examiner* — Mark R Wendell
(74) *Attorney, Agent, or Firm* — Reising Ethington P.C.

(57) ABSTRACT

Aspects of the present invention relate to a seat cushion including a compressible member and at least one insert. The insert has one or more inflatable bladders. The at least one insert is at least partially encapsulated within the compressible member. Further aspects of the present invention relate to a method of forming a seat cushion; a seat assembly and a vehicle.

11 Claims, 14 Drawing Sheets

(56) References Cited

U.S. PATENT DOCUMENTS

2010/0289302 A1  11/2010  Cheng
2017/0368972 A1  12/2017  Fujikake et al.
2018/0072199 A1   3/2018  Strumolo et al.
2018/0361897 A1  12/2018  Lem et al.
2019/0308537 A1  10/2019  Steinberger et al.
2019/0351787 A1  11/2019  Lodhia et al.

OTHER PUBLICATIONS

Written Opinion corresponding to International Application No. PCT/EP2020/071501, dated Nov. 12, 2020, 7 pages.
Combined Search and Examination Report corresponding to Great Britain Application No. GB1910978.4, dated Jan. 29, 2020, 5 pages.
European Office Action corresponding to application 20 750 632.0, dated Jul. 2, 2024, 5 pages.

* cited by examiner

SEATING APPARATUS

TECHNICAL FIELD

The present disclosure relates to a seating apparatus. Aspects of the invention relate to a seat cushion, a vehicle seat assembly, an insert, a vehicle and a method of forming a compressible member.

BACKGROUND

It is known to provide a vehicle seat with a variety of ways of adjustment to enable occupant comfort. For example, a vehicle seat may be provided with a pneumatic bladder to give adjustable support. The pneumatic bladder may be positioned underneath or on top of the seat foam. Most commonly these pneumatic bladders are found in the seat back to provide lower back (lumbar) support but they are known to have been used in the cushion region to support the body of the seated occupant. Lumbar support is often both height and depth adjustable. The firmness of the seat foam is specified as a result of two main factors, the vehicle ride aspiration (where the occupant needs to be seated in relation to the vehicle design) and for safety for homologation (legal certification), which requires the occupant to be in a pre-defined location. Conventional pneumatic bladders used in seats have a single chamber and inflate uniformly. This means conventional pneumatic bladders exert a force in all directions resulting in variations in the seat properties. Furthermore, a known vehicle seat typically comprises a seat back and a seat base. The vehicle seat may comprise one or more seat cushions each being upholstered with a respective seat cover. Seat covers of the seat assembly may be prone to sag due to a reduction in the tautness of the seat cover. The sag may be a result of stretching or deformation of the seat cover, for example due to repeated or prolonged use. Alternatively, or in addition, sag may be caused by deformation of a compressible member in the seat cushion, for example due to localised or repeat loading. The appearance of the vehicle seat may be adversely affected as a result of sag of the seat cover. It is an aim of the present invention to address one or more of the disadvantages associated with the prior art.

SUMMARY OF THE INVENTION

Aspects and embodiments of the invention provide a seat cushion, a vehicle seat assembly, an insert, a vehicle, and a method of forming a compressible member as claimed in the appended claims.

According to an aspect of the present invention there is provided a seat cushion comprising: a compressible member; and at least one insert comprising one or more inflatable bladders; wherein the at least one insert is at least partially encapsulated within the compressible member. The or each inflatable bladder is disposed at least partially within the compressible member. At least in certain embodiments, the or each inflatable bladder is partially or completely encapsulated within the compressible member. The one or more inflatable bladders can be inflated to controllably adjust one or more properties of the seat cushion, for example to adjust a firmness or a hardness of the seat cushion. When inflated the one or more inflatable bladders expand and may compress the surrounding region of the compressible member which at least partially encapsulates the inflatable bladder. This compression may reduce compliance of the compressible member and creates a harder (firmer) condition for the seat occupant. The one or more inflatable bladders may be installed in capillaries formed in the foam; or the one or more bladders may be moulded into the compressible member during fabrication. The or each inflatable bladder may be spaced apart from an outer surface of the compressible member.

At least in certain embodiments, the behavioural properties of the seat cushion can be adjusted by varying an inflation pressure of the one or more inflatable bladders. The inflation pressure may be adjusted by the user to improve comfort. The seat cushion may be an adaptive seat for stiffness and/or hardness.

The one or more inflatable bladders may be configured to inflate predominantly (or exclusively) in a single axis. For example, the or each inflatable bladders may be configured such that the inflation primarily increases the depth of the inflatable bladder. The or each inflatable bladder may have a multi-cell arrangement, for example composed of an upper cavity and a lower cavity. The cells in the multi-cell arrangement may be in fluid communication with each other. More than one bladder may be installed within the compressible member, for example to extend under a main occupant contact area of the seat cushion. When inflated, the or each inflatable bladder compresses the compressible member (nominally in a vertical axis) effectively increasing the local density of the foam where the bladder interfaces the foam. This may increase the hardness or firmness of the seat cushion. Since each bladder is installed within foam and the load absorption of the foam is maintained, at least in certain embodiments the effective foam (comfort) depth may not be reduced. The one or more inflatable bladders may be arranged longitudinally within the seat foam. Alternatively, or in addition, the one or more inflatable bladders may be arranged laterally. The or each inflatable bladder may comprise one or more elongated sections. The or each inflatable bladder may optionally comprise a plurality of the elongated sections. The elongated sections may extend substantially parallel to each other. The at least one inflatable bladder may be co-moulded with the compressible member.

The seat cushion may be provided in a seat base or a seat back. The seat cushion may be provided in a leg support, such as a calf support. Alternatively, or in addition, the seat cushion may be incorporated into a lateral support, such as a lumbar support.

The compressible member may comprise at least one chamber associated with the or each inflatable bladder. The at least one chamber may be configured to accommodate expansion of at least part of the associated inflatable bladder. The at least one chamber may be pre-formed within the compressible member. The at least one chamber may, for example, be formed when the compressible member is moulded. The at least one chamber may be formed concurrent with the at least partial encapsulation of the at least one insert. The or each chamber may form an expansion chamber into which the or each inflatable bladder can expand. The chamber can be profiled to control expansion of the inflatable bladder, for example to control a direction and/or an extent of the expansion of the or each inflatable bladder. The or each chamber and the associated inflatable bladder may have complementary profiles when the bladder is inflated.

The insert may comprise at least one support element for cooperating with a support arm to support the insert during a moulding operation. The at least one support element may be disposed adjacent to the inflatable bladder. The at least one support element may be configured to form the at least one chamber in the compressible member. The at least one support element and the inflatable bladder may have at least substantially the same profile. The at least one support element may be deformable. The at least one support element may comprise a sleeve. The or each support element may form a pocket. The pocket may be configured to receive a support arm for supporting the insert. The pocket may be open at a first end and/or a second end. The support element may be disposed adjacent to the inflatable bladder.

The or each insert may comprise a first inflatable bladder and a second inflatable bladder. The first and second inflatable bladders may be inflatable together or independently of each other. The first inflatable bladder and the second inflatable bladder may be in fluid communication with each other. Alternatively, the first inflatable bladder and the second inflatable bladder may not be fluid communication with each other. The first inflatable bladder may be disposed at a proximal end of the insert. The second inflatable bladder is disposed at a distal end of the insert.

The seat cushion may comprise a first port in fluid communication with the first inflatable bladder; and a second port in fluid communication with the second inflatable bladder. The first port and second port may be provided in a manifold for connection to a supply line for supplying a pressurised fluid, such as air. The supply line may be connected to a pressurised air supply for supplying air to inflate the at least one inflatable bladder. The pressurised air supply may comprise a compressor and/or a reservoir. The first and second ports may be disposed at a first end of the insert.

The seat cushion may comprise a first inflatable bladder disposed in a first lateral position; and a second inflatable bladder disposed in a second lateral position. Alternatively, or in addition, the seat cushion may comprise a first inflatable bladder disposed in a front position; and a second inflatable bladder disposed in a rear position.

According to a further aspect of the present invention there is provided a vehicle seat assembly comprising one or more seat cushions as described herein. The seat cushion described herein may be incorporated into a seat base or a seat back. Alternatively, or in addition, the one or more seat cushion may provide a supplementary support. For example, the seat cushion may comprise a lumbar support, a thigh support or a leg support.

The vehicle seat assembly may be operable to implement a first control function comprising: a first cycle comprising inflating and deflating the first inflatable bladder; and a second cycle comprising inflating and deflating the second inflatable bladder. The first and second cycles may be controlled to induce a cyclical motion about a first axis. The cyclical motion about the first axis may be suitable for massaging a seat occupant. The first and second cycles may be out of phase with each other. The seat cushion may be disposed in a base of the vehicle seat assembly. The first axis may be a longitudinal axis. The induced cyclical motion may comprise a rolling hip motion. A control system may control the inflation and deflation of the first and second inflatable bladders. The vehicle seat assembly may be operable to implement a second control function comprising: a third cycle comprising inflating and deflating the first inflatable bladder; and a fourth cycle comprising inflating and deflating the second inflatable bladder. The third and fourth cycles may be controlled to induce a cyclical motion about a second axis. The cyclical motion about the first axis may be suitable for massaging a seat occupant. The third and fourth cycles may be in phase with each other. The second axis may be a transverse axis. The induced cyclical motion may comprise a pitching hip motion. A control system may control the inflation and deflation of the third and fourth inflatable bladders. At least in certain embodiments, the first control function and/or the second control function may provide an anti-fatigue function. The first control function and/or the second control function may induce a rhythmic motion of the hips and/or spine of the occupant which is representative of the motion occurring when a person is walking. The first control function and/or the second control function may have an operating frequency of 20 to 100 cycles per minute, more particularly 30 to 70 cycles per minute, for example 50 cycles per minute. It is believed that this may enhance spinal lubrication and/or increase blood flow compared to a static posture.

The vehicle seat assembly may be configured to reduce the inflation pressure when an occupant sits on the seat cushion. The controlled reduction in the inflation pressure may provide a seat welcome feature on initial sit-in via the relaxing effect of the partial or complete deflation of the first and second inflatable bladders.

According to a further aspect of the present invention there is provided an insert for encapsulation at least partially within a compressible member, the insert comprising: at least one inflatable bladder; and at least one support element for cooperating with a support arm to support the insert during a moulding operation.

The at least one support element may be configured to form a chamber in the compressible member to accommodate expansion of the at least one inflatable bladder. The or each support element may be expandable to form the chamber. The or each support element may be disposed alongside the inflatable bladder. The or each support element may be configured to form the chamber alongside the at least one inflatable bladder. The or each support element may form a pocket. The inflatable bladder could comprise more than one pocket. For example, the inflatable bladder may comprise first and second pockets for receiving respective first and second support members. The first and second pockets may be disposed on opposing sides of the inflatable bladder.

The insert may comprise one or more elongated sections. The insert may optionally comprise a plurality of the elongated sections. The elongated sections may extend substantially parallel to each other. The insert may comprise at least a first inflatable bladder and a second inflatable bladder. The first and second inflatable bladders may be inflatable together or independently of each other. The first inflatable bladder may be disposed at a proximal end of the insert. The second inflatable bladder may be disposed at a distal end of the insert. The insert may comprise a first port in fluid communication with the first inflatable bladder; and a second port in fluid communication with the second inflatable bladder.

According to a further aspect of the present invention there is provided a method of forming a compressible member having at least one insert at least partially encapsulated therein, the method comprising: disposing the at least one insert in a mould cavity, the or each insert comprising at least one inflatable bladder; and introducing a foaming material into the mould cavity to form the compressible member, the foaming material at least partially encapsulating the at least one insert.

The foaming material may comprise a thermoplastic elastomer foaming material. The foaming material may be a polymer, such polyurethane (PU). The method may comprise forming a chamber in the compressible member to accommodate expansion of the at least one inflatable bladder. The at least one insert may comprise at least one support element for cooperating with a support arm to support the insert within the mould cavity. The at least one support element may be configured to form a pocket. The method may comprise expanding the pocket to form the chamber. The at least one support arm may be introduced into the pocket to expand the pocket. The method may comprise removing the compressible member from the mould cavity by withdrawing the at least one support arm from the pocket.

According to an aspect of the present invention there is provided a seat cushion comprising: a compressible member; and one or more inflatable bladders; wherein the compressible member comprises at least one chamber associated with the or each inflatable bladder, the at least one chamber being pre-formed within the compressible member and configured to accommodate expansion of at least part of the associated inflatable bladder. The one or more inflatable bladders may be at least partially encapsulated within the compressible member.

According to a further aspect of the present invention there is provided a seat cushion comprising: at least first and second inflatable bladders, the first and second inflatable bladders being inflatable independently of each other; a control system for control of the inflation and deflation of the first and second inflatable bladders to induce a rolling hip motion and/or a pitching hip motion. The rolling hip motion and/or the pitching hip motion may induce a rhythmic motion of the hips and/or spine of a seat occupant which is representative of the motion occurring when a person is walking. The first and second inflatable bladders may be alternately inflated and deflated to induce the rolling hip motion and/or the pitching hip motion. The first inflatable bladder may be inflated as the second inflatable bladder is deflated; and the first inflatable bladder may be deflated as the second inflatable bladder is inflated. In use, the seat cushion may provide an anti-fatigue function. It is believed that this may enhance spinal lubrication and/or increase blood flow compared to a static posture. The control system may be configured such that the rolling hip motion and/or the pitching hip motion have a frequency which approximates the cadence of a person walking, for example a cadence of 100 steps per minute. The inflation and deflation of each inflatable bladder represents one operating cycle. The control system may be configured such that the first and second inflatable bladders each perform in the range of 20 to 100 operating cycles per minute. The control system may be configured such that the first and second inflatable bladders each perform in the range of 30 to 70 operating cycles per minute. The control system may be configured such that the first and second inflatable bladders each perform 50 operating cycles per minute. The inflatable bladders may be disposed on opposing sides of the seat cushion. The inflatable bladders may be disposed in front and rear positions respectively.

According to a further aspect of the present invention there is provided a method of controlling inflatable bladders disposed in a seat cushion to provide an anti-fatigue function, the method comprising: selectively inflating and deflating at least first and second inflatable bladders disposed in the seat cushion to induce a rolling hip motion and/or a pitching hip motion. The method may comprise inflating and deflating each of the first and second inflatable bladders 20 to 100 times per minute. The method may comprise inflating and deflating each of the first and second inflatable bladders 30 to 70 times per minute. The method may comprise inflating and deflating each of the first and second inflatable bladders 50 times per minute. The inflatable bladders may be disposed on opposing sides of the seat cushion. The inflatable bladders may be disposed in front and rear positions respectively.

According to a further aspect of the present invention there is provided a vehicle comprising one or more vehicle seat assembly as described herein.

According to a further aspect of the present invention there is provided a control system for controlling inflation of a seat cushion in a seat assembly, wherein the seat cushion comprises one or more inflatable bladders and a seat cushion cover; the control system comprising one or more controllers, the control system being configured to: determine an occupancy status of the seat assembly, the occupancy status indicating one of a seat occupied state and a seat unoccupied state. In dependence on the determined occupancy status indicating that the seat assembly is in a seat unoccupied state, the control system may generate a pressure increase signal to increase an inflation pressure of the one or more inflatable bladders to reduce sag in the seat cushion cover. In use, the one or more inflatable bladders may be inflated to reduce sag in the seat cushion cover. The volume of the or each inflatable bladder increases as the inflation pressure increases. The resulting expansion of the seat cushion may increase the tension of the seat cushion cover. The reduced sag in the seat cushion cover may, for example, pre-condition the seat cushion. The seat cushion may be pre-conditioned to receive an occupant. The inflation of the one or more inflatable bladders may reduce or minimise sagging of the seat cover, thereby improving the appearance of the seat assembly. A perceived quality of the seat cushion may be improved. The seat assembly may be installed in a vehicle. The seat cushion may be pre-conditioned for an individual, for example prior to or concurrent with the individual entering the vehicle.

The seat assembly may be provided in a vehicle. For example, the seat assembly may be provided in a first (front) row of a vehicle. Alternatively, the seat assembly may be provided in a second row or a third row of a vehicle.

The one or more controllers may be configured to receive an occupancy status signal. For example, the one or more controllers may receive the occupancy status signal from seat occupancy sensing means, such as one or more seat occupancy sensor. The one or more seat occupancy sensor may be configured to detect the presence or absence of a seat occupant. The seat occupancy sensor(s) may comprise a load sensor for detecting a load indicative of a person sitting in the seat assembly. Alternatively, or in addition, the seat occupancy sensor may comprise an imaging system for detecting the presence or absence of a person sitting in the seat assembly. The occupancy status signal may indicate one of the seat occupied state and the seat unoccupied state.

The one or more controllers may collectively comprise at least one electronic processor having an electrical input for receiving a seat occupancy status signal indicating the occupancy status of the seat assembly; and at least one memory device electrically coupled to the at least one electronic processor and having instructions stored therein. The at least one electronic processor may be configured to access the at least one memory device and execute the instructions thereon so as to generate the pressure increase signal to increase an inflation pressure of the one or more inflatable bladders.

The one or more controllers may be configured to generate the pressure increase signal. The pressure increase signal may be output to one or more valves for controlling a supply of pressurised air to the one or more inflatable bladders. Alternatively, or in addition, the pressure increase signal may be output to a pump or compressor for supplying pressurised air to the one or more inflatable bladders.

The control system may be configured to receive a seat occupancy signal indicating that the seat assembly is occupied or unoccupied. The occupancy status may be determined in dependence on the seat occupancy signal. The control system may be configured to receive an activation signal. The pressure increase signal may be generated in dependence on receipt of the activation signal.

The seat assembly may be installed in a vehicle having a vehicle door. The activation signal may be generated in dependence on one or more of the following: detection of an activation of an electronic device associated with the vehicle; determination that the vehicle door is unlocked; determination that the vehicle door is opened; and/or determination that a handle of the vehicle door is actuated. The electronic device may, for example, comprise a key fob, or a cellular telephone.

The control system may be configured to monitor the occupancy status to identify a first change from the seat unoccupied state to the seat occupied state. In dependence on identification of the first change in the determined occupancy status, the control system may generate a decrease pressure signal to decrease the inflation pressure of the one or more inflatable bladders. The decrease in the inflation pressure may reduce the firmness of the seat cushion, for example to improve comfort. In use, the control system may reduce the inflation pressure when an occupant sits in the seat assembly. The controlled reduction in the inflation pressure may provide a seat welcome feature on initial sit-in via the relaxing effect of the partial or complete deflation of the first and second inflatable bladders.

The seat assembly may be configurable in a deployed condition (for seating an occupant); and a stowed condition (for reducing the space occupied by the seat assembly). The control system may be configured to detect whether the seating assembly is in a deployed condition or in a stowed condition. The control system may be configured to inhibit increases in the pressure of the one or more inflatable bladders if the seat assembly is in a stowed condition. The control system may be configured to detect a change in the condition of the seat assembly from a stowed condition to a deployed condition; and/or from a deployed condition to a stowed condition. The control system may be configured to increase the pressure of the one or more inflatable bladders upon detecting a change in the condition of the seat assembly from the stowed condition to the deployed condition. The pressure of the one or more inflatable bladders may be increased once the seat assembly is in the deployed condition or as the seat assembly is re-configured to the deployed condition. The control system may be configured to decrease the pressure of the one or more inflatable bladders upon detecting a change in the condition of the seat assembly from the deployed condition to the stowed condition. The pressure of the one or more inflatable bladders may be decreased once the seat assembly is in the stowed condition or as the seat assembly is re-configured to the stowed condition.

According to a still further aspect of the present invention there is provided a control system for controlling inflation of a seat cushion in a seat assembly, wherein the seat cushion comprises one or more inflatable bladders and a seat cushion cover; the control system comprising one or more controllers, the control system being configured to: determine an occupancy status of the seat assembly, the occupancy status indicating one of a seat occupied state and a seat unoccupied state; and monitor the occupancy status to identify a first change from the seat unoccupied state to the seat occupied state. In dependence on identification of the first change in the determined occupancy status, the control system may generate a decrease pressure signal to decrease the inflation pressure of the one or more inflatable bladders. The control system may be configured to monitor the occupancy status to identify a second change from the seat occupied state to the seat unoccupied state. In dependence on identification of the second change in the determined occupancy status, the control system may generate the pressure increase signal to increase the inflation pressure of the one or more inflatable bladders. The control system may be configured to identify or predict when the occupant is vacating the seat assembly. In dependence on the identification or prediction, the control system may generate the pressure increase signal to increase the inflation pressure of the one or more inflatable bladders. Increasing the inflation pressure of the one or more inflatable bladders may help the occupant as they vacate the seat assembly.

According to a still further aspect of the present invention there is provided a control system for controlling inflation of a seat cushion in a seat assembly, wherein the seat cushion comprises one or more inflatable bladders and a seat cushion cover; the control system comprising one or more controllers, the control system being configured to: determine an occupancy status of the seat assembly, the occupancy status indicating one of a seat occupied state and a seat unoccupied state; and identify or predict when the occupant is vacating the seat assembly. In dependence on the identification or prediction, the control system may generate a pressure increase signal to increase the inflation pressure of the one or more inflatable bladders. The one or more inflatable bladders may be provided in a seat cushion provided in the seat base. The seat cushion may, for example, comprise or consist of a central seating region. The seat assembly may comprise one or more side bolsters. The one or more side bolsters may be disposed in a lateral position of the seat assembly. The one or more side bolsters may be associated with the seat back and/or the seat base. One or more inflatable bladders may be provided in the or each side bolster. In dependence on the identification or prediction, the control system may generate a pressure decrease signal to decrease the inflation pressure of the one or more inflatable bladders disposed in the or each side bolster. The control system may decrease the inflation pressure of the side bolster disposed proximal to a vehicle door to facilitate egress from the vehicle. The control system may optionally increase the inflation pressure of the side bolster disposed distal from the vehicle door to facilitate egress from the vehicle. The control system may monitor the occupancy status to identify a change from the seat occupied state to the seat unoccupied state. Identification of the change may be used by the control system to identify that the occupant is vacating the seat assembly. The control system may be configured to identify or predict that an occupant is vacating (or preparing to vacate) the seat assembly by identifying an indicator. The indicator may, for example, comprise actuation of a door handle of the vehicle door. The control system may, for example, receive a door opening signal. Other indicators may include one or more of the following: engagement of a parking brake; selection of a parked gear; removal of a key; un-buckling or un-latching of a seatbelt associated with the seat. The control system may be configured to identify or predict that the seat assembly will be occupied. The pressure increase signal may be generated in dependence on the identification. The seat cushion may be preconditioned for an individual prior to them occupying the seat assembly. The detection of an electronic device, such as a key fob or cellular telephone, may be used to identify or predict that the seat assembly will be occupied. The electronic device may be associated with the vehicle in which the seat assembly is installed. The seat cushion may comprise at least first and second inflatable bladders. The control system may be configured to increase or decrease the inflation pressure of the first and second inflatable bladders in a predetermined sequence. The pressure increase signal may control inflation of the first and second inflatable bladders in a predetermined sequence. For example, the first inflatable bladder may be inflated and then the second inflatable bladder may be inflated. The control system may be configured to set a target inflation pressure for the one or more inflatable bladders. The pressure increase signal may increase the inflation pressure of the one or more inflatable bladders to a target inflation pressure. The control system may be configured to inflate the first and second inflatable bladders to the same inflation pressure or to different inflation pressures. The different inflation pressures may, for example, reflect different sag properties of the seat cushion cover. The control system may be configured to estimate usage of the seat assembly and to set the target inflation pressure in dependence on the estimated usage. The control system may estimate usage in dependence on one or more of the following: elapsed time, such as the age of the vehicle; mileage (total distance travelled) of the vehicle; a cumulative time that the seat assembly is occupied; and a total ingress/egress cycles for the seat assembly. The pressure increase signal may control operation of at least one valve associated with the or each inflatable bladder; and/or operation of a pump or compressor for inflating the one or more inflatable bladders. The control system may be configured to detect the presence or absence of an object on the seat assembly. The control system may be configured to inhibit generation of the pressure increase signal when the object is present. The object, may, for example be a child seat. The child seat may be fastened using a mechanical locking mechanism. The locking mechanism may communicate with a vehicle system to indicate the presence of the child seat. Alternatively, the object may be a load, such as a container, a bag or a package. The object may be detected using a load or weight sensor. The object may be detected using an optical or thermal sensor arranged to monitor the occupancy status of one or more seats.

According to a further aspect of the present invention there is provided a vehicle comprising a control system as described herein. The vehicle may comprise at least one seat assembly having a seat cushion. The seat cushion may have a seat cushion cover and one or more inflatable bladders. The control system may be configured to generate a pressure increase signal to control an inflation pressure of the one or more inflatable bladders to reduce sag of the seat cushion cover.

According to a further aspect of the present invention there is provided a method of controlling inflation of a seat cushion in a seat assembly, the seat cushion comprising a seat cushion cover and one or more inflatable bladders. The method may comprise determining an occupancy status of the seat assembly, the occupancy status may indicate one of a seat occupied state and a seat unoccupied state. In dependence on the determined occupancy status indicating that the seat assembly is in a seat unoccupied state, the control system may increase an inflation pressure of the one or more inflatable bladders to reduce sag in the seat cushion cover. The seat assembly may be installed in a vehicle. The seat assembly may be provided in a first (front) row of a vehicle. Alternatively, the seat assembly may be provided in a second row or a third row of a vehicle. The method may comprise increasing the inflation pressure of the one or more inflatable bladders in dependence on an activation event. The seat assembly may be installed in a vehicle having a vehicle door. The activation event may comprise one or more of the following: activation of an electronic device associated with the vehicle; the vehicle door being unlocked; the vehicle door being opened; and/or actuation of a handle of the vehicle door. The method may comprise identifying a first change in the occupancy status from the seat unoccupied state to the seat occupied state. In dependence on identification of the first change, the method may comprise decreasing the inflation pressure of the one or more inflatable bladders. The method may comprise identifying a second change in the occupancy status from the seat occupied state to the seat unoccupied state. In dependence on identification of the second change, the method may comprise increasing the inflation pressure of the one or more inflatable bladders. The method may comprise identifying or predicting when the occupant is vacating the seat assembly. In dependence on the identification or prediction, the method may comprise increasing the inflation pressure of the one or more inflatable bladders. The seat cushion may comprise at least first and second inflatable bladders. The method may comprise increasing or decreasing the inflation pressure of the first and second inflatable bladders in a predetermined sequence. The method may comprise increasing the inflation pressure of the one or more inflatable bladders to a target inflation pressure. The method may comprise estimating usage of the seat assembly and setting the target inflation pressure in dependence on the estimated usage. The method may comprise detecting the presence or absence of an object. The method may comprise inhibiting increases in the pressure of the one or more inflatable bladders if the object is present. The object may be a child seat or other load. The seat assembly may be configurable in a deployed condition (for seating an occupant); and a stowed condition (for reducing the space occupied by the seat assembly). The method may comprise detecting whether the seating assembly is in a deployed condition or in a stowed condition. The method may comprise inhibiting increases in the pressure of the one or more inflatable bladders if the seat assembly is in a stowed condition. The method may comprise detecting a change in the condition of the seat assembly from a stowed condition to a deployed condition; and/or from a deployed condition to a stowed condition. The method may comprise increasing the pressure of the one or more inflatable bladders upon detecting a change in the condition of the seat assembly from the stowed condition to the deployed condition. The pressure of the one or more inflatable bladders may be increased once the seat assembly is in the deployed condition or as the seat assembly is re-configured to the deployed condition. The method may comprise decreasing the pressure of the one or more inflatable bladders upon detecting a change in the condition of the seat assembly from the deployed condition to the stowed condition. The pressure of the one or more inflatable bladders may be decreased once the seat assembly is in the stowed condition or as the seat assembly is re-configured to the stowed condition.

According to a still further aspect of the present invention there is provided a computer software that, when executed, is arranged to perform a method as described herein.

According to a still further aspect of the present invention there is provided a non-transitory, computer-readable storage medium storing instructions thereon that, when executed by one or more electronic processors, causes the one or more electronic processors to carry out the method described herein.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

A seat cushion 1 in accordance with an embodiment of the present invention is described herein with reference to the accompanying Figures. As described herein, the stiffness of the seat cushion 1 can be adapted to suit specific requirements.

Figure 1:
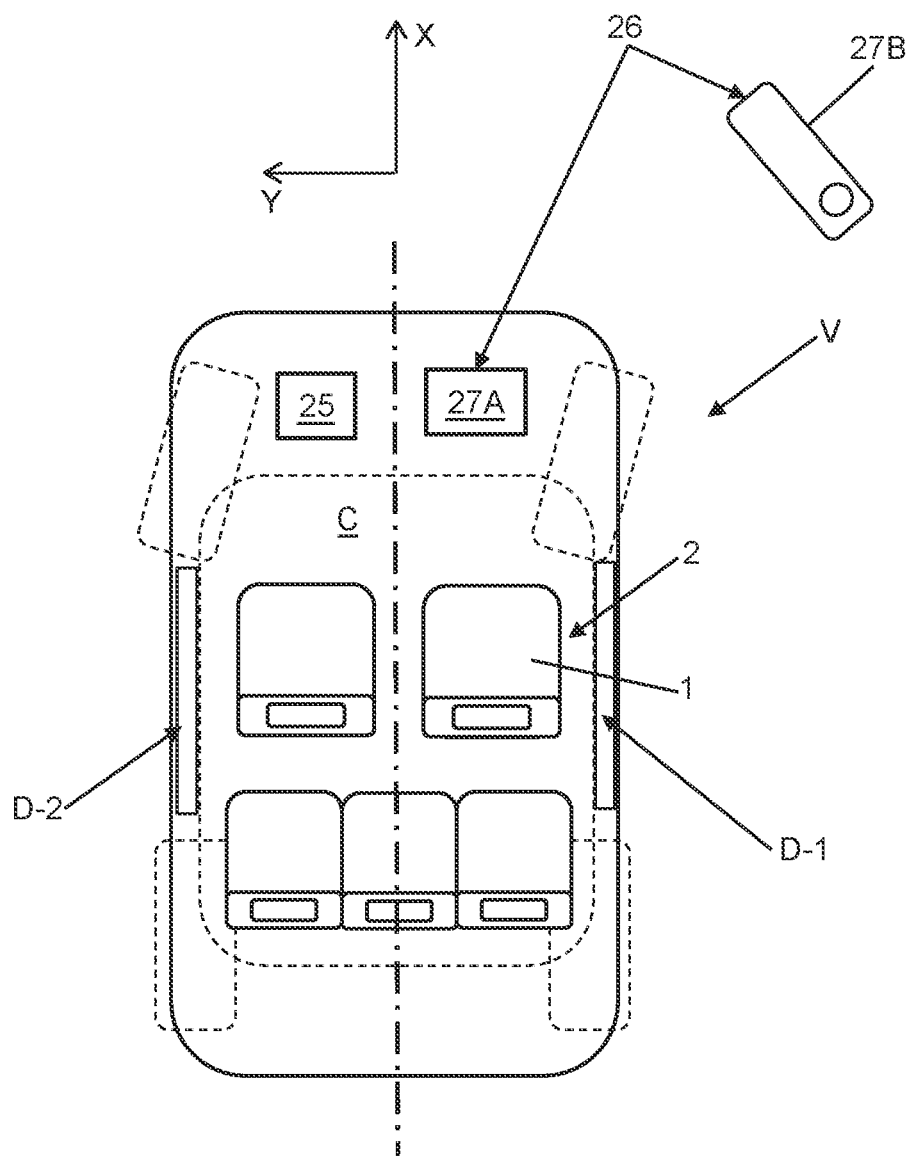
FIG. 1 shows a schematic representation of a vehicle comprising vehicle seat assemblies having a seat cushion in accordance with an embodiment of the present invention.

The seat cushion 1 in the present embodiment is disposed in a seat assembly 2 of a vehicle V. As shown in FIG. 1, the vehicle V is an automobile in the present embodiment. The seat cushion 1 could be used in other types of vehicle V, such as a utility vehicle, a tractor unit, a train, a ship or an aircraft. The seat cushion 1 and the seat assembly 2 are described herein with reference to a reference frame comprising a longitudinal axis X, a transverse axis Y and a vertical axis Z. The vehicle V has a cabin C in which a plurality of the seat assemblies 2 are mounted. The cabin C has at least first and second doors D-n for ingress/egress. For the sake of brevity, only one of the seat assemblies 2 is described herein.

Figure 2:
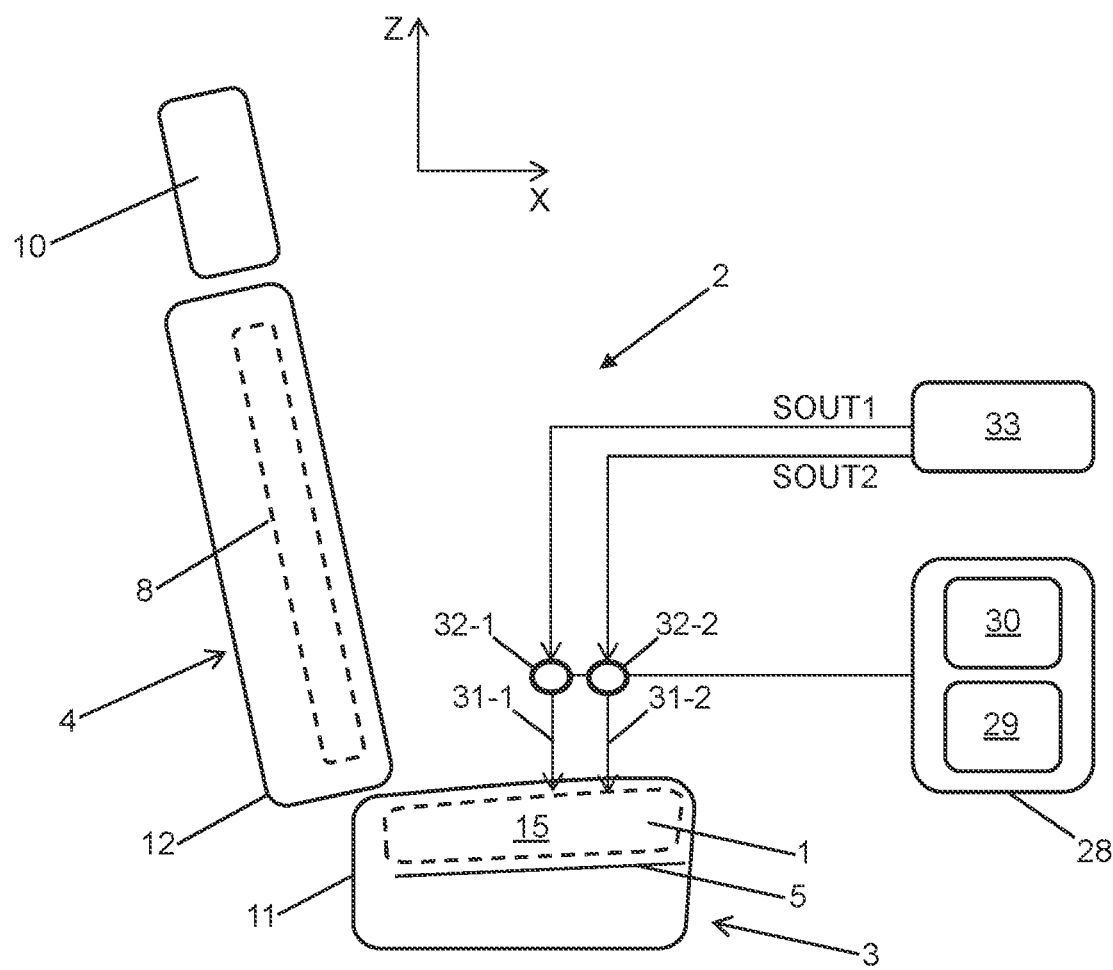
FIG. 2 shows a side elevation of one of the vehicle seat assembly shown in FIG. 1.
Figure 3:
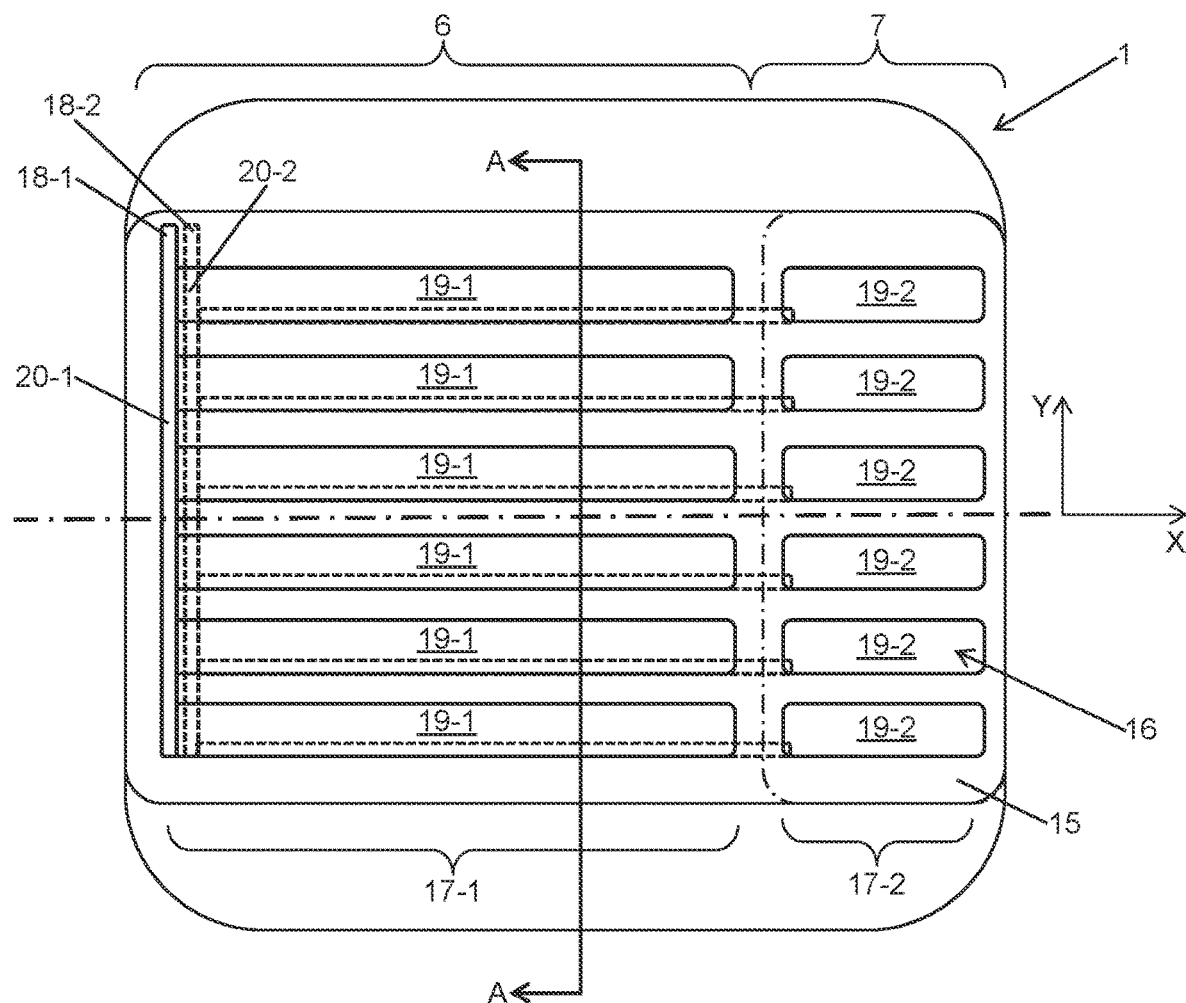
FIG. 3 shows a schematic plan view representation of a seat cushion according to an embodiment of the present invention.
Figure 4:
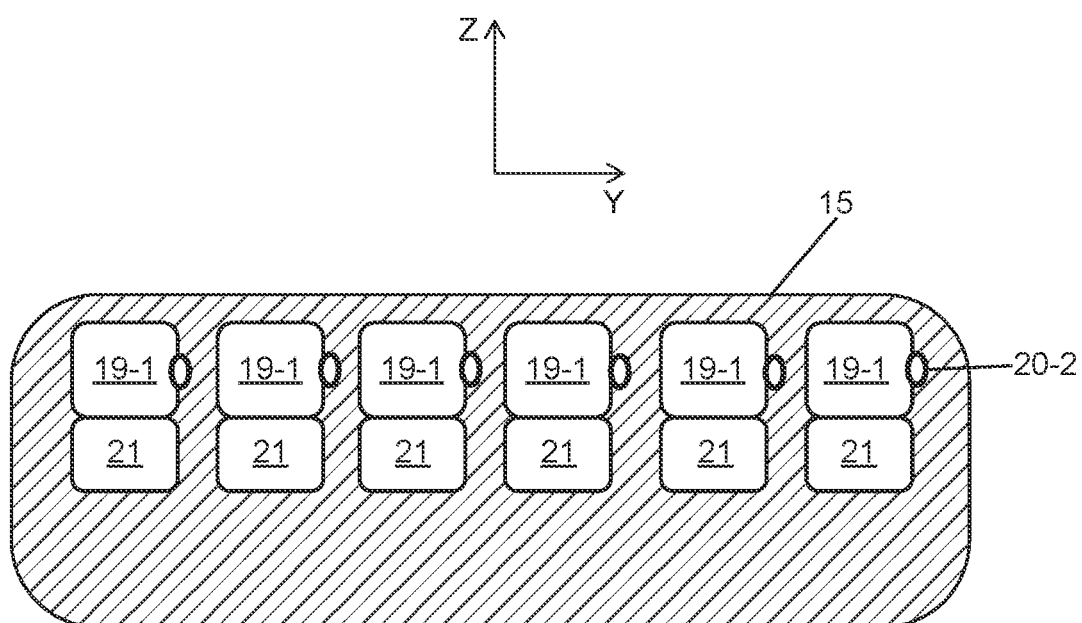
FIG. 4 shows a sectional view of the seat cushion shown in FIG. 3.

As shown in FIG. 2, the vehicle seat assembly 2 comprises a seat base 3 and a seat back 4. The seat cushion 1 in the present embodiment forms part of the seat base 3. Alternatively, or in addition, the seat cushion 1 could form part of the seat back 4. The seat cushion 1 is supported in the seat base 3 by a seat pan 5 mounted to a seat chassis (not shown). The seat chassis may be in the form of a seat frame or seat structure. The seat pan 5 comprises a plate member for supporting the seat cushion 1. The seat chassis is mounted to the floor of the vehicle V. The seat chassis may enable the longitudinal and/or vertical position of the seat pan 5 to be adjusted relative to a floor of the vehicle V. As shown in FIG. 3, the seat cushion 1 comprises a central seating region 6 and a thigh support 7 for supporting the thighs of a seat occupant. The position of the thigh support 7 relative to the central seating region 6 may be adjustable, for example to adjust the thigh support for the seat occupant. The vertical and/or longitudinal position of the thigh support 7 may be adjustable relative to the central seating region 6. The seat back 4 comprises a frame (not shown) which supports a back-support cushion 8 and opposing lateral lumbar supports (not shown). The seat back 4 also comprises a head rest 10. The seat back 4 may be pivotally mounted to the seat chassis to enable a recline angle of the seat back 4 to be adjusted relative to the seat base 3. A first seat cover 11 is provided over the seat base 3 to protect the seat cushion 1. A second seat cover 12 is provided over the seat back 4. At least in certain embodiments, the vehicle seat assembly 2 may be selectively configurable in a deployed condition (for seating an occupant); and a stowed condition (for reducing the space occupied by the seat assembly). The vehicle seat assembly 2 is illustrated in the deployed condition in FIG. 2. In the stowed condition, the seat back 4 is typically pivoted forwards such that the back-support cushion 8 faces the seat cushion 1.

The composition of the seat cushion 1 will now be described. The seat cushion 1 comprises a compressible member 15 and at least one insert 16. The compressible member is a foam member. The or each insert 16 is at least partially encapsulated within the compressible member 15. As described herein, the or each insert 16 is co-moulded with the compressible member 15. The insert 16 is integral with the compressible member 15. The compressible member 15 is moulded from a foaming material, such as a thermoplastic elastomer foaming material, which is introduced into a mould cavity 51. The insert 16 is pre-formed and introduced into the mould cavity 51 prior to introduction of the foaming material. Thus, the insert 16 is at least partially encapsulated by the foam in the mould cavity 51. The forming of the seat cushion 1 is described in more detail herein with reference to FIGS. 5A, and 5C. The compressible member 15 may comprise a foam having an open cell or a closed cell structure. The seat cushion 1 in the present embodiment comprises a single insert 16 which is encapsulated within the compressible member 15. The insert 16 comprises at least one inflatable bladder 17-$n$. The or each inflatable bladder 17-$n$ comprises at least one port 18-$n$ for connection to a pressurised gas supply, typically a pressurised air supply. The or each inflatable bladder 17-*n* has a multi-cell composition to promote inflation in a single axis. In the present embodiment, each inflatable bladder 17-*n* comprises first and second cells disposed on top of each other to promote expansion in a vertical axis.

The insert 16 comprises first and second inflatable bladders 17-1, 17-2 which are inflatable independently of each other. The first inflatable bladder 17-1 is associated with a rear portion of the seating region 6; and the second inflatable bladder 17-2 is associated with a front portion of the seating region 6. In a variant, the second inflatable bladder 17-2 (and/or a separate inflatable bladder) may be associated with the thigh support 7. The first and second inflatable bladders 17-1, 17-2 have respective first and second ports 18-1, 18-2. The first and second ports 18-1, 18-2 are positioned at a first end of the seat cushion 1 for location proximal to the seat back 4 in the seat assembly 2. The first inflatable bladder 17-1 comprises a plurality of elongated first tubular members 19-1, each of the first tubular members 19-1 being in fluid communication with the first port 18-1. In the present embodiment, the first inflatable bladder 17-1 comprises six (6) of the first tubular members 19-1, but less than six (6) and more than six (6) first tubular members 19-1 are also contemplated. The second inflatable bladder 17-2 comprises a plurality of elongated second tubular members 19-2, the second tubular members 19-2 each being in fluid communication with the second port 18-2. In the present embodiment, the second inflatable bladder 17-2 comprises six (6) of the second tubular members 19-2, but less than six (6) and more than six (6) second tubular members 19-2 are also contemplated. In the present embodiment, the first and second tubular members 19-1, 19-2 are arranged in pairs extending along a longitudinal axis.

As shown in FIG. 3, a first supply line 20-1 connects the first tubular members 19-1 to each other and to the first port 18-1. As shown in FIG. 3, at least one second supply line 20-2 (shown in dashed lines) connects the second tubular members 19-2 to each other and to the second port 18-*n*. The second inflatable bladder 17-2 comprises a plurality of second fluid supply lines 20-2. The second fluid supply lines 20-2 extend along the length of a corresponding one of the first tubular members 19-1 and open into the second tubular members 19-2. In a variant, the second inflatable bladder 17-2 may comprise a transverse line extending directly between the second tubular members 19-2. The first and second inflatable bladders 17-1, 17-2 are each formed by bonding first and second gas-impermeable sheet members to each other to form sealed (fluid-tight) join lines which define the first and second tubular members 19-1, 19-2. The first and second fluid supply lines 20-1, 20-2 may be formed integrally with the first and second inflatable bladders 17-1, 17-2, for example by forming sealed join lines. Other techniques may be employed to form the first and second tubular members 19-1, 19-2. The first and second ports 18-1, 18-2 are bonded to the sheet members, for example using an adhesive or thermal bonding agent.

The seat cushion 1 comprises a plurality of chambers 21 associated with the or each inflatable bladder 17-1, 17-2. In the present embodiment, the chambers 21 are formed below the or each inflatable bladder 17-1, 17-2. The chambers 21 are hollow voids formed within the compressible member 15. In the present embodiment, one of the chambers 21 is formed adjacent to each of the tubular members 19-1, 19-2. The or each chamber 21 is pre-formed within the compressible member 15 and functions as an expansion chamber into which the associated inflatable bladder 17-1, 17-2 can expand. By pre-forming the at least one chamber 21, the inflatable bladder 17-1, 17-2 can expand within the compressible member 15. At least in certain embodiments, this expansion can occur with reduced or minimal localised compression of the compressible member 15. The insert 16 comprises one or more support elements 22. The or each support element 22 is configured to form a lining of an associated one of the chambers 21 formed in the compressible member 15. In the present embodiment, the insert 16 comprises a plurality of support elements 22 each associated with a respective one of the first and second tubular members 19-1, 19-2. The support elements 22 each comprise a sleeve which forms a pocket 24 which is open at a proximal first end and closed at a distal second end. In a variant, the pocket 24 may be open at both the first and second ends. The support element 22 may be formed integrally with the insert 16, for example from one of the sheet members used to form the first and second inflatable bladders 17-1, 17-2.

Figure 5A:
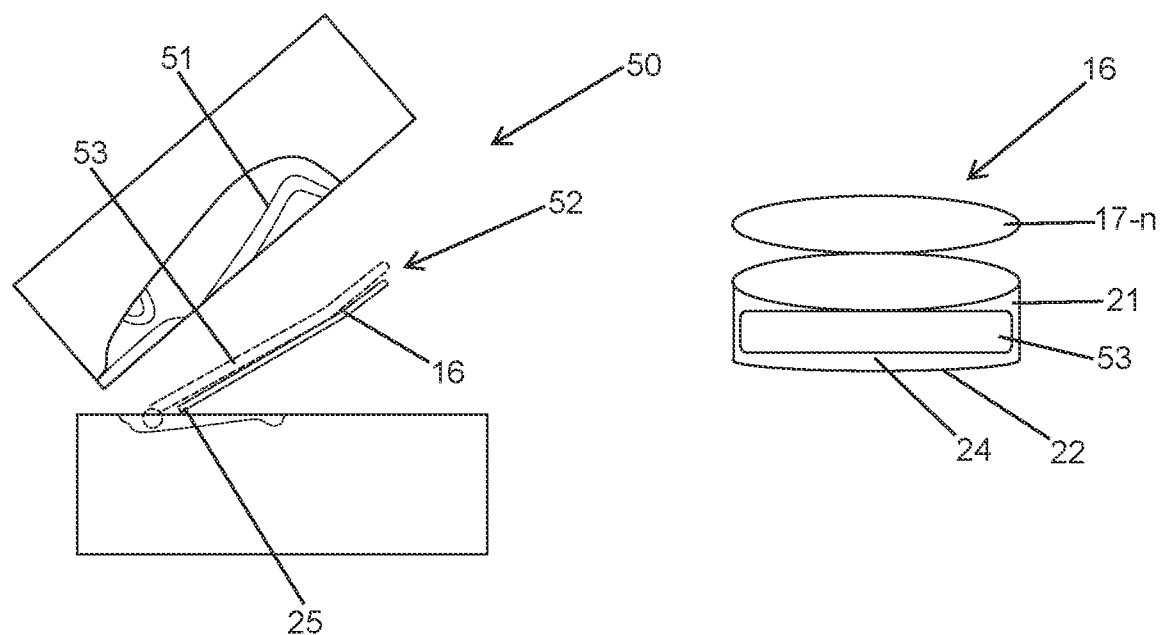
FIGS. 5A, 5B, 5C, 5D and 5E show stages in the moulding of the seat cushion in accordance with an embodiment of the present invention.

The seat cushion 1 is injection moulded in a mould 50. The compressible member 15 is moulded from a foaming material and, as described herein, the insert 16 is at least partially encapsulated therein. The fabrication process will now be described with reference to FIGS. 5A, 5B, 5C, 5D and 5E. As shown in FIG. 5A, the mould 50 is opened and the insert 16 located in a mould cavity 51. A support assembly 52 is provided to support the insert 16 in the desired location within the mould cavity 51. The support assembly 52 is movable between a first position for performing the moulding process, and at least one second position for removal/insertion of the moulded seat cushion 1. The support assembly 52 is pivotally mounted to enable movement between the first and second positions. In use, the support assembly 52 pivots through an angle of between 30° and 45° as it moves between the first and second positions. Alternatively, or in addition, the support assembly 2 may translate between the first and second positions. The support assembly 52 comprises a plurality of support arms 53 arranged to locate within respective pockets 24 formed by the support elements 22. The support arms 53 are inserted through the open first end 25 of each pocket 24. The support arms 53 are profiled to expand the pockets 24 formed in the insert 16. An end view of the support arms 53 disposed in the pockets 24 is shown in FIG. 5A. A releasable retaining device, such as a vacuum pump may optionally be used to retain the insert 16 on the support assembly 52. The support arms 53 are configured to form the chambers 21 within the compressible member 15. In particular, the support arms 53 are sized to expand the pockets 24 when the insert 16 is disposed on the support assembly 52.

Figure 5B:
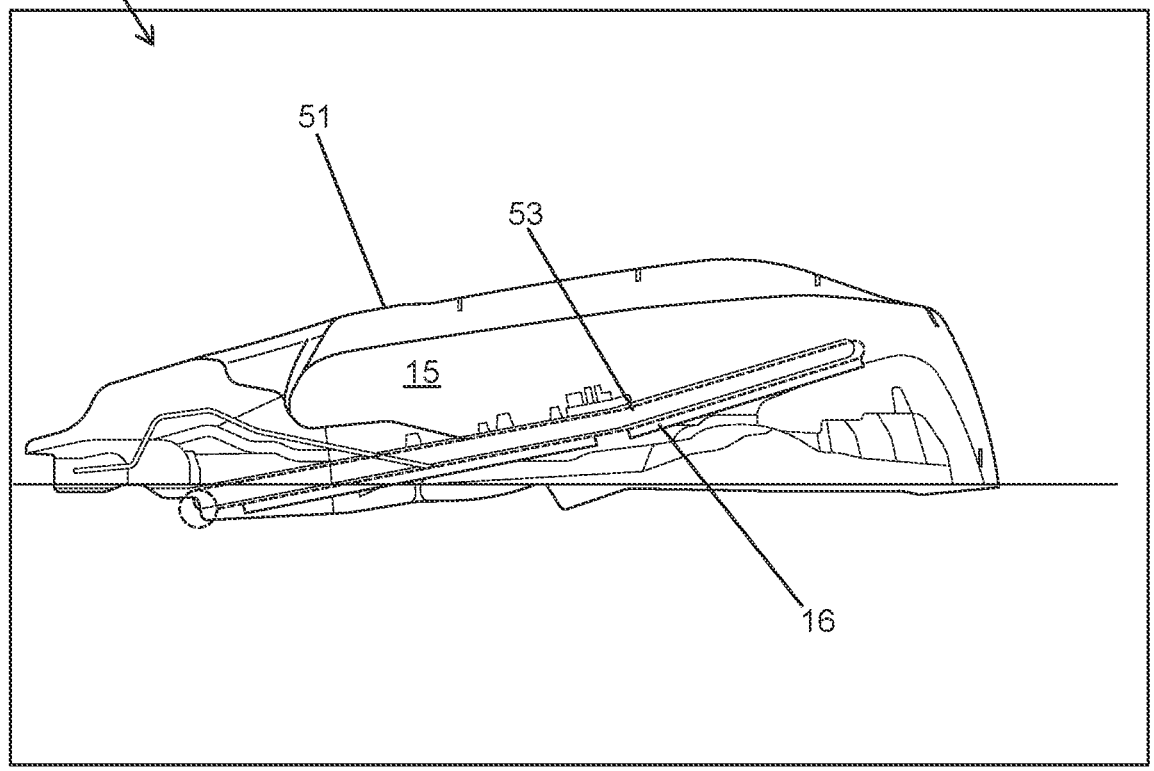
Figure 5C:
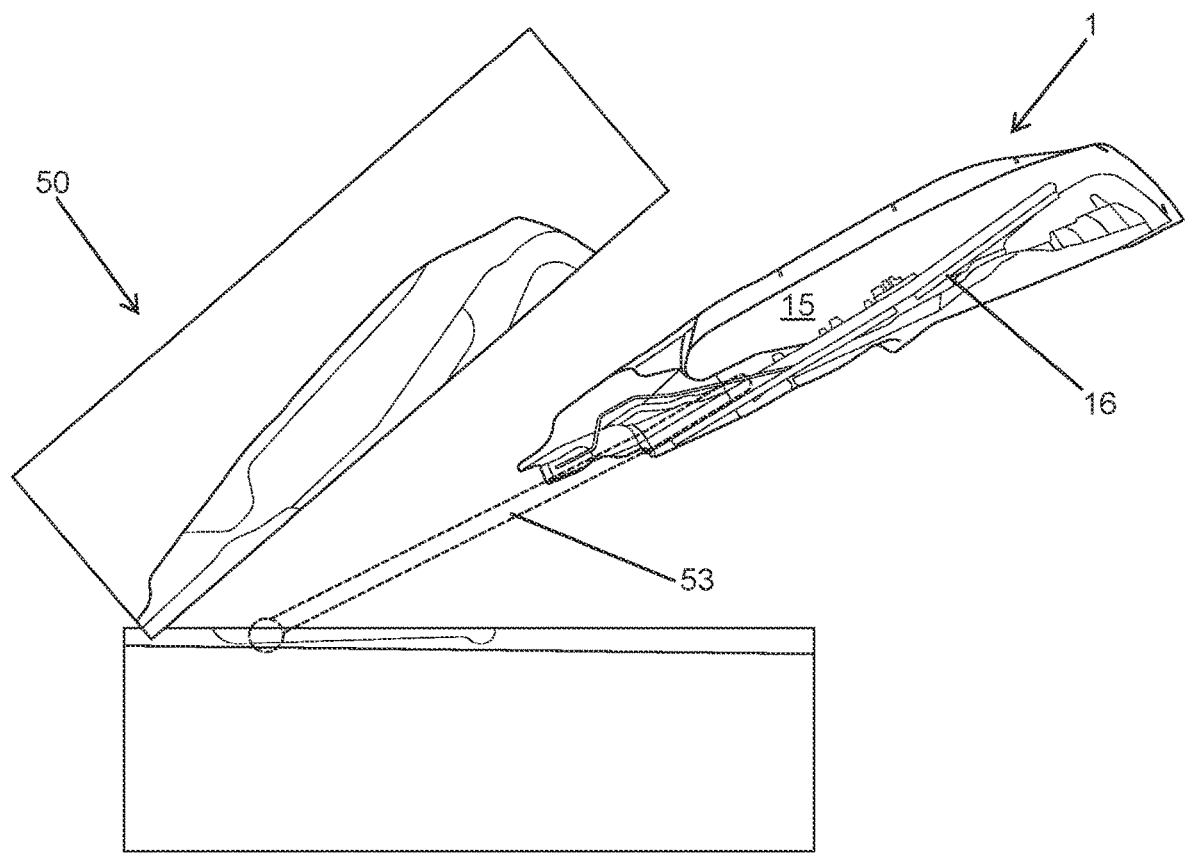

The support assembly 52 is secured in the first position within the mould cavity 51 and the mould closed, as shown in FIG. 5B. The foaming material is introduced into the mould cavity 51 to form the compressible member 15. The foaming material at least substantially fills the mould cavity 51. The foaming material fills the region around the first and second tubular members 19-1, 19-2, thereby at least partially encapsulating the insert 16. The foaming material cures and the mould cavity 51 is opened. The support assembly 52 is displaced from the first position to the second position. As shown in FIG. 5C, the seat cushion 1 is removed from the mould cavity 51 by sliding the seat cushion 1 off the support assembly 52. The support arms 53 are removed from the pockets 24, thereby opening the chamber(s) 21 within the compressible member 15. The support element 22 prevents or reduces contact between the foaming material and the support arms 53 thereby facilitating removal of the seat cushion 1 from the support assembly 52. The insert 16 is co-moulded into the compressible member 15 of the seat cushion 1. The pockets 24 are disposed on an upper side of the insert 16 such that the chambers 21 are formed above the insert 16. In a variant, the pockets 24 may be disposed on an underside of the insert 16 such that the chambers 21 are formed below the insert 16. The insert 16 may optionally comprise one or more interlocking features to secure the insert 16 in the compressible member 15.

Figure 5D:
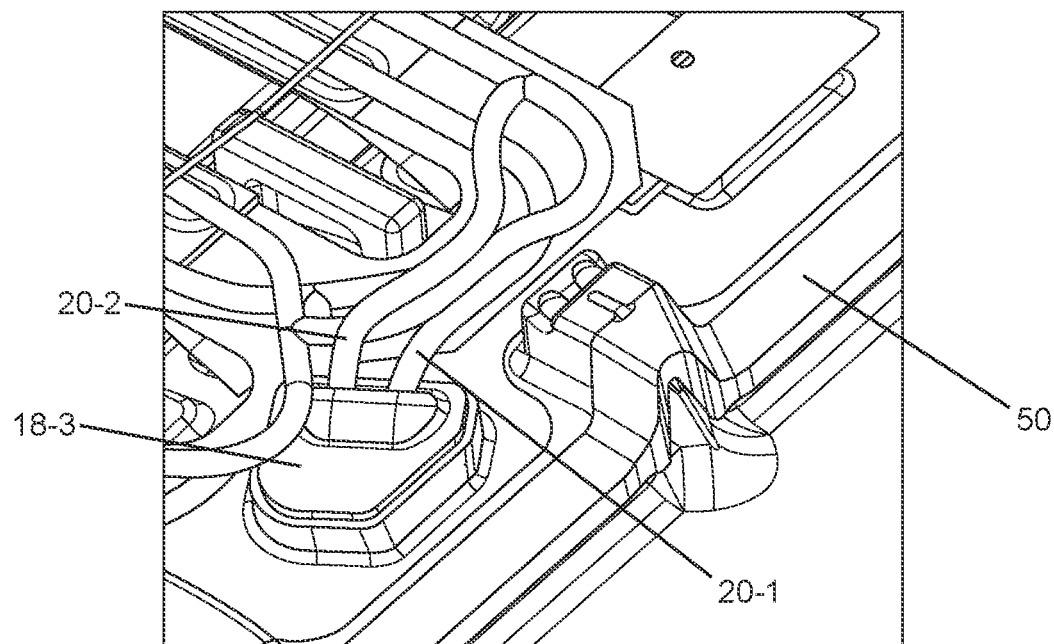
Figure 5E:
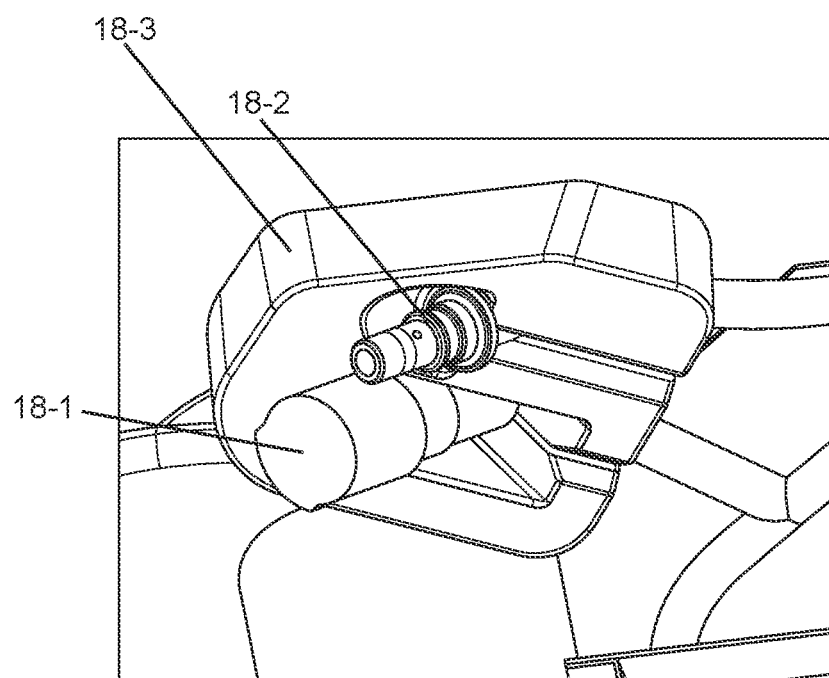

In accordance with some embodiments of the present invention, and as illustrated in FIGS. 5D and 5E, during the moulding process first and second ports 18-1, 18-2 may be held within a locating element 18-3. The locating element 18-3 is configured to be located within the mould 50 and during the moulding process to accurately locate and hold in place the first and second ports 18-1, 18-2 and the ends of the supply lines 20-1, 20-2 connected thereto. During the moulding process, the locating element 18-3 is only partially encapsulated within the compressible member such that once the seat cushion 1 has been removed from the mould cavity 51 the first and second ports 18-1, 18-2 are accessible for subsequent connection to a pressurised gas supply.

Advantageously, the locating element 18-3 enables the ends of the first and second ports 18-1, 18-2 and the ends of the supply lines 20-1, 20-2 connected thereto to be accurately located and held in place during the moulding process without squashing the ports 18-1, 18-2 and the supply lines 20-1, 20-2, and helps to prevent the foaming material entering the ports 18-1, 18-2 and the supply lines 20-1, 20-2 during the moulding process.

In some embodiments, the locating element 18-3 may comprise a polyurethane block. In addition, the foaming material used for the compressible member 15 may comprise expanded polyurethane. In this manner, the locating element and foaming material bond together during the moulding process to facilitate retention of the locating element 18-3 within the compressible member 15.

Once the seat cushion 1 has been moulded, the first and second inflatable bladders 17-1, 17-2 are inflated by introducing pressurised gas through the first and second ports 18-1, 18-2. In the present embodiment, the first and second inflatable bladders 17-1, 17-2 are pneumatic bladders for inflation with pressurised air. The first and second tubular members 19-1, 19-2 inflate at least partially to fill the chambers 21 formed in the compressible member 15. The properties of the seat cushion 1 can be controlled in dependence on the inflation pressure of the first and second inflatable bladders 17-1, 17-2. A target inflation pressure may be specified for the first inflatable bladder 17-1 and/or the second inflatable bladder 17-2. The target inflation pressure may be specified by a user, for example using an input device; or by a vehicle system, for example in dependence on a current driving mode of the vehicle V. In the present embodiment, the inflation pressure is controllable to enable dynamic adjustment of the properties of the seat cushion 1, for example controllably to increase or decrease stiffness. The first and second ports 18-1, 18-2 are configured to be connected to a pressurised air supply 28 for supplying pressurised air to inflate the first and second inflatable bladders 17-1, 17-2. The pressurised air supply 28 comprises an air compressor 29 and at least one reservoir 30. The pressurised air supply 28 comprises first and second connectors 31-1, 31-2 for connection to the first and second ports 18-1, 18-2. First and second valves 32-1, 32-2 are provided for controlling the supply of pressurised air to the first and second inflatable bladders 17-1, 17-2. The first and second valves 32-1, 32-2 are associated with the first and second ports 18-1, 18-2 respectively. The first and second valves 32-1, 32-2 are two-way valves which can be selectively opened and closed to control inflation and deflation of the first and second inflatable bladders 17-1, 17-2. The first and second valves 32-1, 32-2 are operable independently of each other to enable control of the inflation pressure of each of the first and second inflatable bladders 17-1, 17-2. The first and second inflatable bladders 17-1, 17-2 may have the same or different inflation pressures. The seat cushion 1 could optionally include one or more pressure sensors (not shown) for measuring the pressure in the first and second inflatable bladders 17-1, 17-2. In a variant, the inflation pressure of the first and second inflatable bladders 17-1, 17-2 may be fixed, for example by sealing the first and second ports 18-1, 18-2 when the first and second inflatable bladders 17-1, 17-2 have been inflated to the desired inflation pressure.

Figure 6:
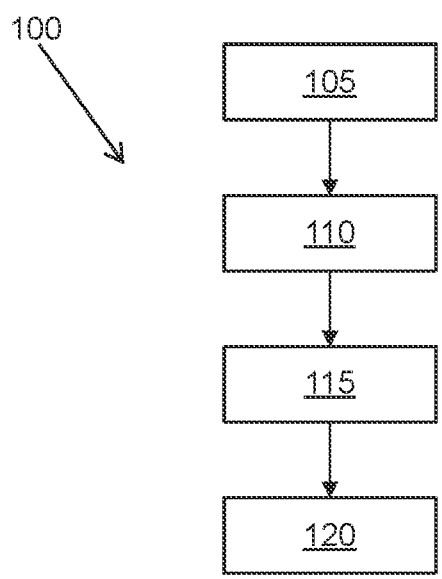
FIG. 6 shows a block diagram representing the process of manufacturing a seat cushion in accordance with an embodiment of the present invention

The process of integrally forming the compressible member 15 and the insert(s) 16 is represented by a block diagram 100 shown in FIG. 6. The insert(s) 16 is disposed in the mould cavity 51 (BLOCK 105). As described herein, the or each insert 16 is disposed on a support arm 53. The support arm 53 is introduced into a pocket 24 formed in each insert 16. The or each pocket 24 is thereby expanded by the support arm 53. In some embodiments, the locating element 18-3 is located within the mould 50 (BLOCK 110) to locate and hold in place the first and second ports 18-1, 18-2 and the ends of the supply lines 20-1, 20-2 connected thereto. A foaming material is introduced into the mould cavity 51 to form the compressible member 15 (BLOCK 115). The foaming material introduced into the mould cavity 51 at least partially encapsulates the at least one insert 16. The foaming material is allowed to cure (BLOCK 120). The compressible member 15 is removed from the mould cavity 51 (BLOCK 125).

According to some embodiments, the vehicle V comprises means for determining an occupancy status of the seat assembly 2. The occupancy status may indicate that the seat assembly 2 is either in a seat occupied state (i.e. the seat assembly 2 is occupied) or a seat unoccupied state (i.e. the seat assembly 2 is unoccupied). The occupancy determining means comprises one or more seat occupancy sensor 25 for detecting the presence or absence of a seat occupant. In the present embodiment, the seat occupancy sensor 25 comprises a load sensor for detecting a load (or weight) indicative of a person sitting in the seat assembly 2. The seat occupancy sensor 25 is disposed in the central seating region 6 of the seat assembly 2, for example below the seat cushion 15. It will be understood that a seat occupancy sensor 25 may be provided for one or more of the vehicle seats 2 disposed in the vehicle V. The occupancy status may be determined in respect of one or more of the vehicle seats 2 in the vehicle V. The seat occupancy sensor 25 is configured to output a seat occupancy status signal SOCC indicating the occupancy status of the seat assembly 2. Other types of sensor, such as a pressure sensor, may be used as the seat occupancy sensor 25. In a variant, the seat occupancy sensor 25 may comprise or consist of an imaging system comprising one or more camera, for example comprising an optical camera or a thermal imaging camera.

In a variant, the seat occupancy sensor 25 may be implemented by an in-cabin imaging system (not shown). The cabin imaging system may be configured to determine the occupancy status of one or more of the vehicle seats 2. The cabin imaging system may comprise at least one imaging sensor, such as an optical or thermal camera, for determining when one or more person is within the cabin of the vehicle V. The at least one imaging sensor can be arranged to capture an image of an interior of the cabin. The imaging sensor may be disposed in an upper region of the cabin of the vehicle V, for example mounted in a headlining, or disposed in a housing of a rear-view mirror; or may be disposed in an instrument panel or a dashboard of the vehicle V. The cabin imaging system may comprise an image processor for determining the occupancy status of the seat assembly 2. The image processor may process image data captured by the at least one imaging sensor in order to identify the presence or absence of a person in a region associated with one or more of the vehicle seats 2. The image processor may thereby determine an occupancy status of one or more of the vehicle seats 2.

In the present embodiment, the vehicle V comprises a remote access system 26 for implementing remote control of one or more vehicle systems. The remote access system 26 may, for example, comprise a Passive Entry Passive Start (PEPS) system or an enhanced Passive Entry Passive Start (ePEPS) system. The remote access system 26 may control one or more door lock or security latches for securing the vehicle doors D-n. The latch(es) may, for example, be unlocked when the remote access system 26 is activated. The remote access system 26 in the present embodiment comprises a base unit 27A provided in the vehicle V and a remote control unit 27B, for example comprising a key fob or a cellular telephone. A user may activate the remote control unit 27B to unlock one or more of the vehicle doors D-n. Alternatively, or in addition, the activation may be performed automatically when the base unit 27A detects the remote control unit 27B. The base unit 27A and the remote control unit 27B may perform an electronic handshake to determine that the remote control unit 27B is associated with the vehicle V. If the electronic handshake is successful, the base unit 27A is configured to output an access signal SACC to unlock one or more of the vehicle doors D-n. In a variant, the remote access system 26 could be configured to release a door opening mechanism at least partially to open the vehicle door D-n.

A control system 33 is provided for controlling operation of the first and second valves 32-1, 32-2. The control system 33 is provided in the vehicle V, for example as a module with a vehicle system controller, and connected to the seat assembly 2. In a variant, the control system 33 could be incorporated into the seat assembly 2, for example in a seat control panel. The control system 30 is configured to generate first and second control signals SOUT1, SOUT2 for controlling operation of the first and second valves 32-1, 32-2. When activated, the control system 33 is configured to open the first and second valves 32-1, 32-2 to inflate the first and second inflatable bladders 17-1, 17-2. The control system 33 is configured to close the first and second valves 32-1, 32-2 when the first and second inflatable bladders 17-1, 17-2 are at respective target inflation pressures. The control system 33 may determine the inflation pressure of the first and second inflatable bladders 17-1, 17-2 in dependence on a signal from one or more pressure sensors. Alternatively, the control system 33 may control the inflation pressure of the first and second inflatable bladders 17-1, 17-2 by opening the first and second valves 32-1, 32-2 for a predetermined period of time. The control system 33 in the present embodiment is activated when the vehicle V is unlocked or a door of the vehicle V is opened. The seat cushion 1 may be pre-conditioned to receive an occupant upon entering the vehicle V. The inflation of the first and second inflatable bladders 17-1, 17-2 may reduce or minimise sagging of the first seat cover 11, thereby improving the appearance of the seat assembly 2. A perceived quality of the seat cushion 1 may be improved. The control system 33 may optionally be configured to reduce the inflation pressure when an occupant sits in the seat assembly 2. The controlled reduction in the inflation pressure may provide a seat welcome feature on initial sit-in via the relaxing effect of the partial or complete deflation of the first and second inflatable bladders.

The seat assembly 2 is installed in the vehicle V and the pressurised air supply 28 is connected to the first and second inflatable bladders 17-1, 17-2 via the first and second ports 18-1, 18-2. The control system 33 is activated and outputs the first and second control signals SOUT1, SOUT2 to open the first and second valves 32-1, 32-2. The pressurised air supply 28 supplies pressurised air and inflates the first and second inflatable bladders 17-1, 17-2. The first and second valves 32-1, 32-2 may be operated in parallel, such that the first and second inflatable bladders 17-1, 17-2 are inflated concurrently; or may be operated sequentially, such that the first and second inflatable bladders 17-1, 17-2 are inflated one after the other. The control system 33 outputs the first and second control signals SOUT1, SOUT2 to close the first and second valves 32-1, 32-2 when the first and second inflatable bladders 17-1, 17-2 have been inflated to the desired inflation pressure. A user may optionally control the inflation pressure of the first and second inflatable bladders 17-1, 17-2, for example to increase or decrease the inflation pressure(s) of each of the first and second inflatable bladders 17-1, 17-2.

Figure 7:
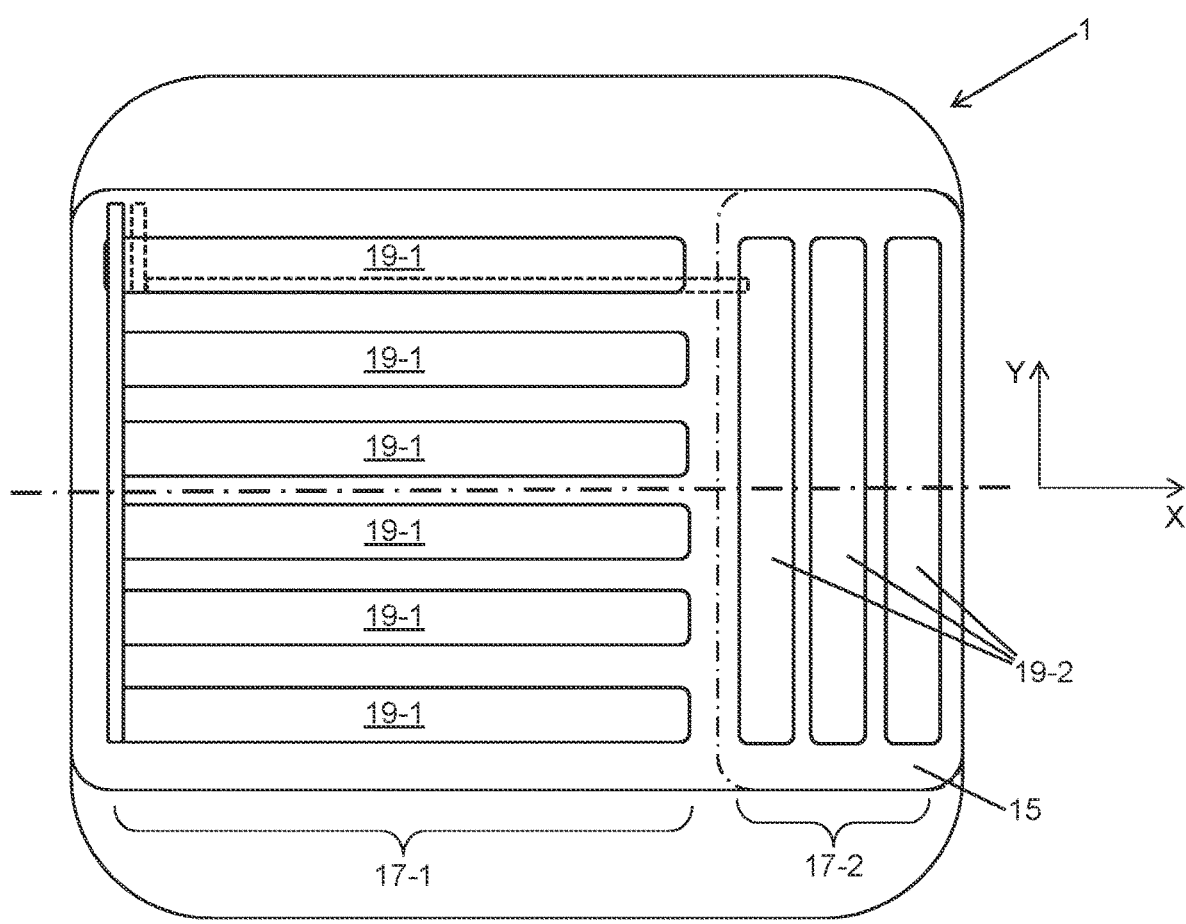
FIG. 7 shows a schematic plan view representation of a variant of the seat cushion shown in FIG. 3.
Figure 8:
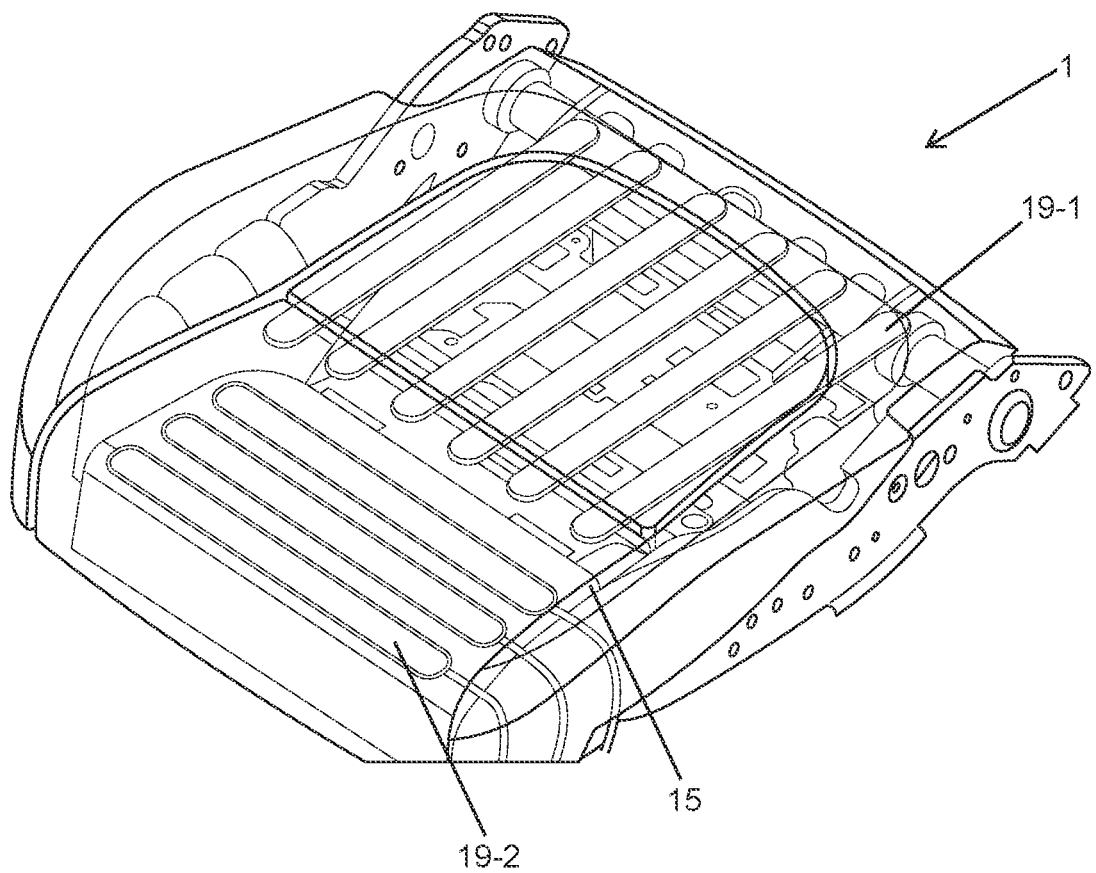
FIG. 8 shows a perspective view of the seat cushion shown in FIG. 7.
Figure 9:
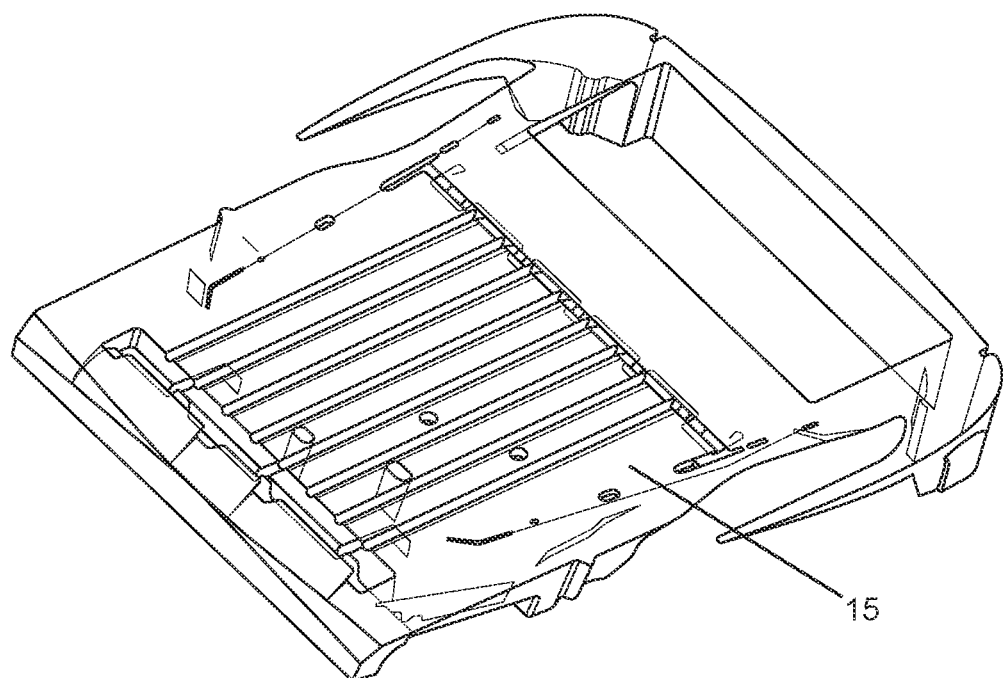
FIG. 9 shows a perspective view of a compressible member of the seat cushion shown in FIGS. 7 and 8.

The second inflatable bladder 17-2 shown in FIG. 3 comprises a plurality of second tubular members 19-2 extending in a longitudinal direction. In a variant, the second inflatable bladder 17-2 may comprise one or more tubular members 19-2 which extend in a transverse direction. This arrangement is illustrated in FIGS. 7 and 8. A perspective view of the compressible insert 15 with the insert 16 omitted is shown in FIG. 9. The control system 33 can be configured to vary the inflation pressure of the first and second inflatable bladders 17-1, 17-2 to provide a control function to provide an anti-fatigue (massage) function for a seat occupant. In particular, the inflation pressure of each of the first and second inflatable bladders 17-1, 17-2 can be increased and decreased sequentially. By alternating the inflation and deflation of the first and second inflatable bladders 17-1, 17-2 out of phase with each other, the seat cushion 1 induces a pitching hip motion for an occupant of the seat assembly 2. The seat cushion 1 can be modified also to provide a rolling hip motion for the occupant. The anti-fatigue function provides an oscillation cycle which may provide longer-term comfort and may mitigate the effects of back discomfort, via oscillation of the spine and surrounding muscular tissue. At least in certain embodiments, the anti-fatigue function may induce a rhythmic motion of the hips and/or spine of the occupant which is representative of the motion occurring when a person is walking. The oscillation cycle could, for example, have an operating frequency of 20 to 100 cycles per minute, for example 50 cycles per minute. It is believed that this may enhance spinal lubrication and/or increase blood flow compared to a static posture.

A further operation of the control system 33 in relation to the seat assembly 2 according to some embodiments of the present invention will now be described in more detail. It will be understood that the same control strategy may be applied for more than one of the vehicle seats 2.

Figure 10A:
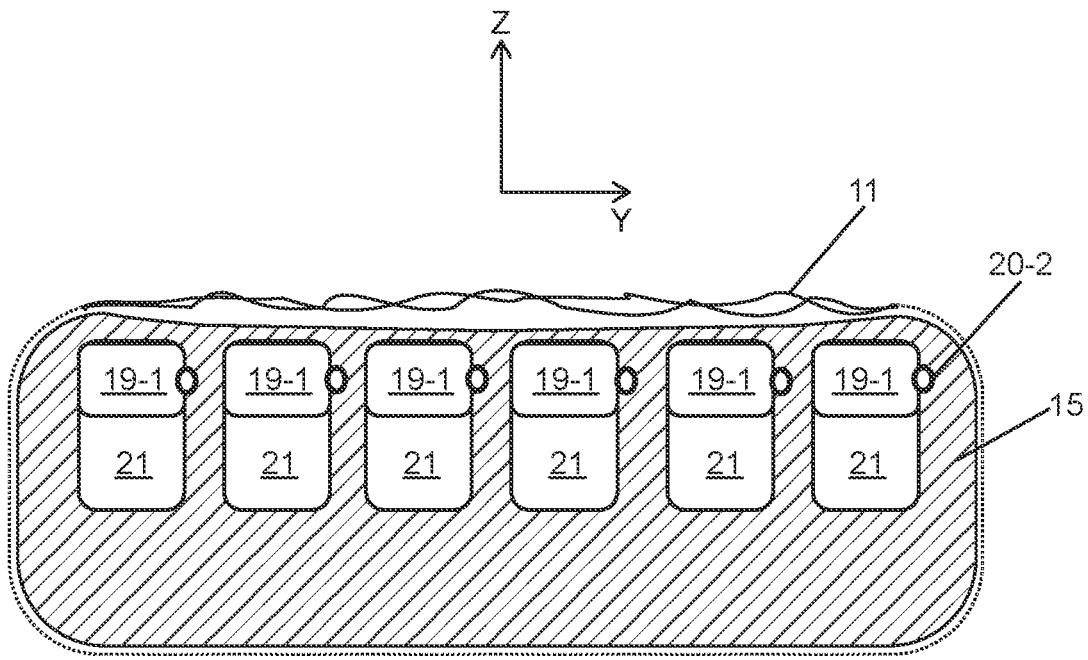
FIG. 10A shows a sectional view of the seat cushion shown in FIG. 3 illustrating sag in an upper region of the seat cover.
Figure 10B:
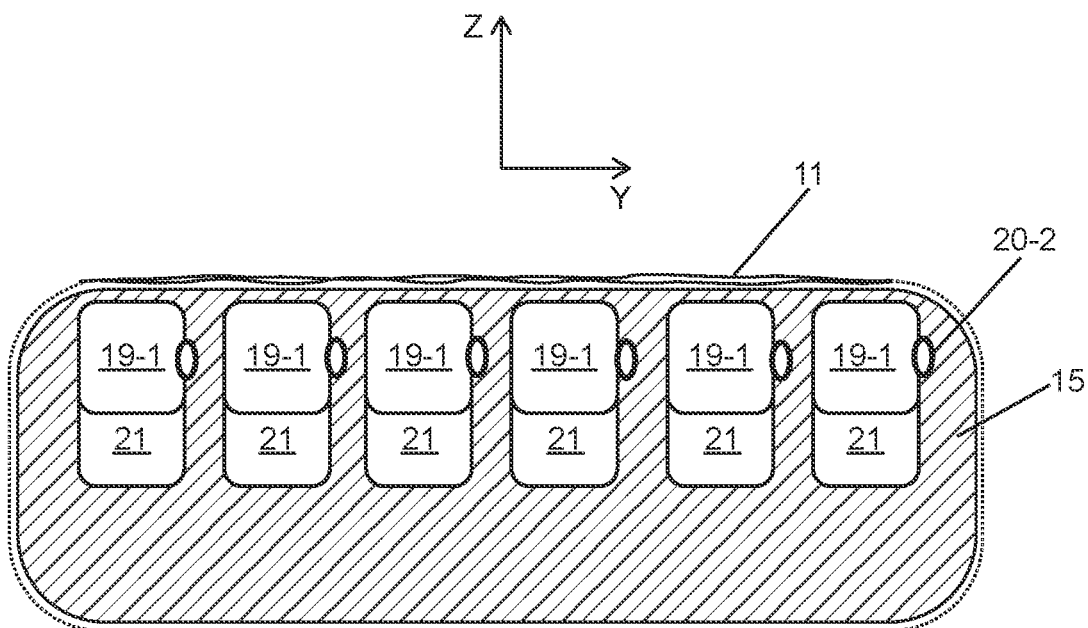
FIG. 10B shows a sectional view of the seat cushion shown in FIG. 3 illustrating reduced sag in the upper region of the seat cover.

The seat assembly 2 may be prone to sag over time due to a reduction in the tautness of the first seat cover 11. A schematic representation of sag in the first seat cover 11 is shown in FIG. 10A. Sag may be caused by stretching or deformation of the first seat cover 11, for example due to repeated or prolonged use. Alternatively, or in addition, sag may be caused by deformation of the compressible member 15, for example due to localised or repeat loading. The first seat cover 11 is subject to increased wear on the upper surface of the seat cushion 1 in the central seating region 6. As illustrated in FIG. 10A, sag of the first seat cover 11 is most prevalent in this upper seating region. Whilst not affecting the functionality of the seat assembly 2, the sag in the first seat cover 11 may prove unsightly, particularly when the seat assembly 2 is unoccupied. The control system 33 is configured to control inflation of at least one of the first and second inflatable bladders 17-1, 17-2 to reduce or prevent sag of the first seat cover 11. In the present embodiment, the control system 33 is configured to increase the inflation pressure of at least one of the first and second inflatable bladders 17-1, 17-2 to tension the first seat cover 11, thereby reducing sag. At least in certain embodiments, the appearance of the vehicle seat 1 may be improved. A schematic representation of the reduced sag in the first seat cover 11 due to the increased inflation pressure of the first inflatable bladders 17-1 is shown in FIG. 10B.

The sag of the first seat cover 11 is most apparent when the seat assembly 2 is unoccupied. To address this, the control system 33 is configured to increase the inflation pressure of at least one of the first and second inflatable bladders 17-1, 17-2 in dependence on a determination that the seat assembly 2 is unoccupied. As outlined above, the seat occupancy sensor 25 outputs the seat occupancy status signal SOCC indicating the occupancy status of the seat assembly 2 (i.e. that the seat assembly 2 is occupied or unoccupied). The control system 33 reads the seat occupancy status signal SOCC to determine when the seat assembly 2 is unoccupied.

The determination that the seat assembly 2 is unoccupied provides an entry condition for controlling inflation of the first and second inflatable bladders 17-1, 17-2 to reduce sag of the first seat cover 11. The control system 33 is configured to control inflation of the first and second inflatable bladders 17-1, 17-2 in dependence on the determination that the seat assembly 2 is unoccupied. The control system 33 identifies one or more trigger events which, in combination with the determination that the seat assembly 2 is unoccupied, prompt the control system 33 to increase the inflation pressure of at least one of the first and second inflatable bladders 17-1, 17-2. In the present embodiment, the activation of the remote control unit 27B is the trigger event for initiating an increase in the inflation pressure of the first and second inflatable bladders 17-1, 17-2 to reduce sag. The control system 33 receives the access signal SACC and checks the seat occupancy status signal SOCC to determine if the seat assembly 2 is occupied or unoccupied. If the control system 33 determines that the seat assembly 2 is unoccupied, the pressure increase signal SINC is generated to inflate the first inflatable bladder 17-1 and/or the second inflatable bladder 17-2. As shown in FIG. 10B the inflation of one or both of the first and second inflatable bladders 17-1, 17-2 reduces the sag of the first seat cover 11. It will be understood that other trigger events may be used to initiate inflation of at least one of the first and second inflatable bladders 17-1, 17-2. Other trigger events include one or more of the following: determination that the vehicle door D is unlocked; determination that the vehicle door D is opened; and/or determination that a handle associated with the vehicle door D is actuated.

The control system 33 is activated and generates the pressure increase signal SINC. The pressure increase signal SINC comprises at least one of the first and second control signals SOUT1, SOUT2 for controlling operation of the first and second valves 32-1, 32-2. The first and second valves 32-1, 32-2 are opened in response to the first and second control signals SOUT1, SOUT2. The air supply 28 supplies pressurised air to the first and second inflatable bladders 17-1, 17-2, thereby increasing the inflation pressure of the first and second inflatable bladders 17-1, 17-2. The first and second valves 32-1, 32-2 may be operated in parallel, such that the first and second inflatable bladders 17-1, 17-2 are inflated concurrently; or may be operated sequentially, such that the first and second inflatable bladders 17-1, 17-2 are inflated one after the other. For example, the first inflatable bladder 17-1 may be inflated before the second inflatable bladder 17-2; or the first inflatable bladder 17-1 may be inflated after the second inflatable bladder 17-2. Alternatively, the pressure increase signal SINC may selectively open only one of the first and second valves 32-1, 32-2. It is envisaged that the problem of sag of the first seat cover 11 will be more prevalent in the central seating region 6 of the seat assembly 6. To counter sag in this region, the pressure increase signal SI NC may consist of the first control signal SOUT1 to open the first valve 17-1 to inflate the first inflatable bladder 17-1.

The control system 33 outputs the first control signal SOUT1 to close the first valve 32-1 when the inflation pressure of the first inflatable bladder 17-2 has increased to a first target inflation pressure. The control system 33 outputs the second control signal SOUT2 to close the second valve 32-2 when the inflation pressure of the second inflatable bladder 17-2 has increased to a second target inflation pressure. The first and second target inflation pressures may be the same as each other or different from each other. The degree to which sag occurs typically depends on the usage of the seat assembly 2. Stretching of the first seat cover 11 may increase as a result of repeated or extended use of the seat assembly 2 resulting in increased sag. The control system 33 is configured to estimate usage of the seat assembly 2 and to set the first target inflation pressure and/or the second target inflation pressure in dependence on the estimated usage. In particular, the control system 33 is configured to increase the first target inflation pressure and/or the second target inflation pressure in proportion to the estimated usage. The usage may be estimated in dependence on one or more of the following factors: vehicle age; vehicle mileage; a cumulative time that the seat assembly 2 is occupied; the total number of times that the seat assembly 2 has been used, for example a number of ingress/egress cycles. The usage may be estimated for each seat assembly 2 in the vehicle 2; or may be estimated collectively for two or more of the seat assemblies 2.

The control system 33 pre-conditions the seat assembly 2 for the user. The increase in the inflation pressure of the first and second inflatable bladders 17-1, 17-2 increases the volume of the seat cushion 1 and gently stretches the first seat cover 11. The sag in the first seat cover 11 is thereby reduced and the appearance of the seat assembly 2 can be improved. The increase in the inflation pressure of the first and second inflatable bladders 17-1, 17-2 may also increase the firmness of the seat cushion 1. To improve comfort, the control system 33 is configured to reduce the inflation pressure of the first and second inflatable bladders 17-1, 17-2 when an individual is seated on the seat assembly 2. The control system 33 monitors the seat occupancy status signal SOCC to detect a change in the occupancy status. In particular, the control system 33 identifies a change from the seat unoccupied state to a seat occupied state which indicates that an individual is seated in the seat assembly 2. In dependence on this change in the seat occupancy status, the control system 33 generates a pressure decrease signal SDEC to reduce the inflation pressure. The pressure decrease signal SDEC comprises at least one first control signal SOUT1 and/or a second control signal SOUT2 to open one or both of the first and second valves 32-1, 32-2 to release air. The reduction in the inflation pressure of the first and second inflatable bladders 17-1, 17-2 improves the comfort of the seat assembly 2, for example helping to ease the individual into the seat assembly 2.

The control system 33 may be configured controllably to decrease the inflation pressure of the first and second inflatable bladders 17-1, 17-2 to achieve a target inflation pressure. The control system 33 may output the first control signal SOUT1 to close the first valve 32-1 when the inflation pressure of the first inflatable bladder 17-2 has decreased to a first target inflation pressure. The control system 33 may output the second control signal SOUT2 to close the second valve 32-2 when the inflation pressure of the second inflatable bladder 17-2 has decreased to a second target inflation pressure. The first and second target inflation pressures may be the same as each other or may be different from each other.

The control system 33 may be configured to identify or predict when the occupant is vacating the seat assembly 2 or is preparing to vacate the seat assembly 2. The seat occupancy sensor 25 may detect an occupant movement or a change in the measured load, which is indicative of the occupant vacating the seat assembly 2. To facilitate egress from the vehicle V, the control system 33 may generate a pressure increase signal SI NC in dependence on the determination that the occupant is vacating the seat assembly 2 or is preparing to vacate the seat assembly 2. By increasing the inflation pressure of the one or both of the first and second inflatable bladders 17-1, 17-2, the seat cushion 1 may help to lift or raise the occupant as they leave the seat assembly 2.

Figure 11:
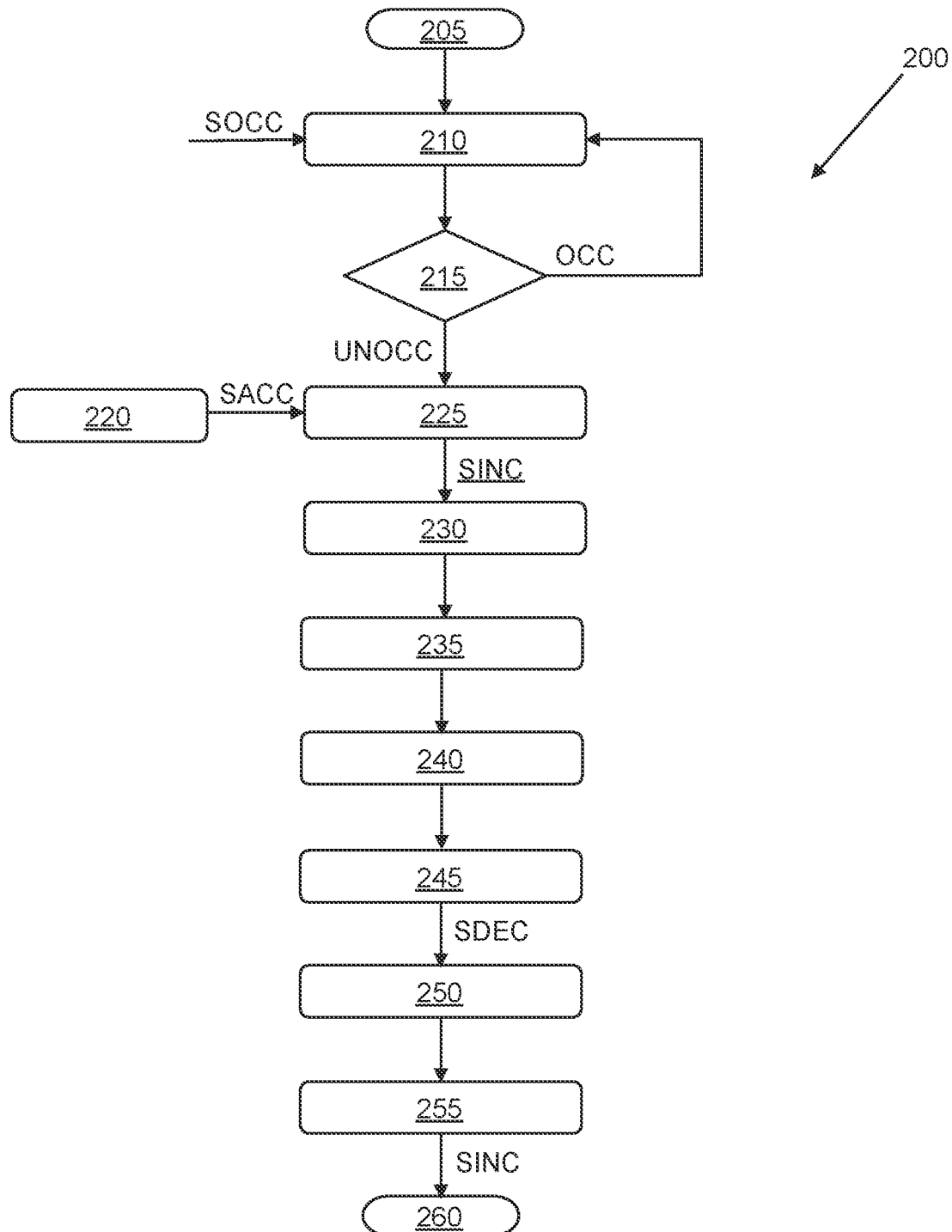
FIG. 11 shows a block diagram representing the operation of the system controller in accordance with an embodiment of the present invention.

This operation of the control system 33 will now be described with reference to a first block diagram 100 shown in FIG. 11. The operation of the control system 33 is initiated (BLOCK 205). The control system 33 monitors the seat occupancy status signal SOCC generated by the seat occupancy sensor 25 (BLOCK 210). The control system 33 determines if the seat assembly 2 is occupied or unoccupied (BLOCK 215). If the seat assembly 2 is occupied (OCC), the control system 33 continues to monitor the seat occupancy. If the seat assembly 2 is unoccupied (UNOCC), the control system 33 monitors one or more trigger event. One such trigger event in the present embodiment is activation of the remote access system 26 on the vehicle V. The base unit 27A provided on the vehicle V outputs the access signal SACC (BLOCK 220). In dependence on receipt of the access signal SACC, the control system 33 generates a pressure increase signal SINC (BLOCK 225). The pressure increase signal SINC is output to the first and second valves 32-1, 32-2 associated with the first and second inflatable bladders 17-1, 17-2 respectively (BLOCK 230). The pressure increase signal SINC opens the first and second valves 32-1, 32-2 and pressurized air (i.e. air at greater than atmospheric pressure) is introduced into the first and second inflatable bladders 17-1, 17-2 (BLOCK 235). The control system 33 may optionally monitor (or estimate) the inflation pressure of the first and second inflatable bladders 17-1, 17-2. The first and second inflatable bladders 17-1, 17-2 are inflated to respective first and second target pressures and the control system 33 outputs first and second control signals SOUT1, SOUT2 to close the first and second valves 32-1, 32-2 (BLOCK 240). The control system 33 monitors the seat occupancy status signal SOCC to determine when the seat assembly 2 is occupied (BLOCK 245). In dependence on the change in the occupancy status of the seat assembly 2, the control system 33 outputs the pressure decrease signal SDEC to reduce the inflation pressure of the first and second inflatable bladders 17-1, 17-2 (BLOCK 250). The control system 33 may optionally also identify or predict when the occupant is vacating the seat assembly, for example with reference to the seat occupancy sensor 25. In dependence on identifying that the occupant is vacating the seat assembly 2, the control system 33 generates the pressure increase signal SI NC (BLOCK 255). The process repeats until the control system 33 is deactivated (BLOCK 260).

The control system 33 may be configured to selectively to inhibit generation of one or both of the pressure increase signal SINC and the pressure decrease signal SDEC. For example, the control system 33 may inhibit generation of one or both of the signals if a child seat is disposed on the seat assembly 2. The control system 33 may, for example, utilise the seat occupancy sensor 25 to detect the presence or absence of a child seat. Alternatively, or in addition, a sensor may be provided to determine when a fastening mechanism in the seat assembly 2 is actuated to secure a child seat.

The second inflatable bladder 17-2 shown in FIG. 3 comprises a plurality of second tubular members 19-2 extending in a longitudinal direction. In a variant, the second inflatable bladder 17-2 may comprise one or more tubular members 19-2 which extend in a transverse direction. This arrangement is illustrated in FIGS. 7 and 8. A perspective view of the compressible insert 15 with the insert 16 omitted is shown in FIG. 9. The control system 33 can be configured to vary the inflation pressure of the first and second inflatable bladders 17-1, 17-2 to provide a control function to provide an anti-fatigue (massage) function for a seat occupant. In particular, the inflation pressure of each of the first and second inflatable bladders 17-1, 17-2 can be increased and decreased sequentially. By alternating the inflation and deflation of the first and second inflatable bladders 17-1, 17-2 out of phase with each other, the seat cushion 1 induces a pitching hip motion for an occupant of the seat assembly 2. The seat cushion 1 can be modified also to provide a rolling hip motion for the occupant. The anti-fatigue function provides an oscillation cycle which may provide longer-term comfort and may mitigate the effects of back discomfort, via oscillation of the spine and surrounding muscular tissue. At least in certain embodiments, the anti-fatigue function may induce a rhythmic motion of the hips and/or spine of the occupant which is representative of the motion occurring when a person is walking. The oscillation cycle could, for example, have an operating frequency of 20 to 100 cycles per minute, for example 50 cycles per minute. It is believed that this may enhance spinal lubrication and/or increase blood flow compared to a static posture.

Figure 12:
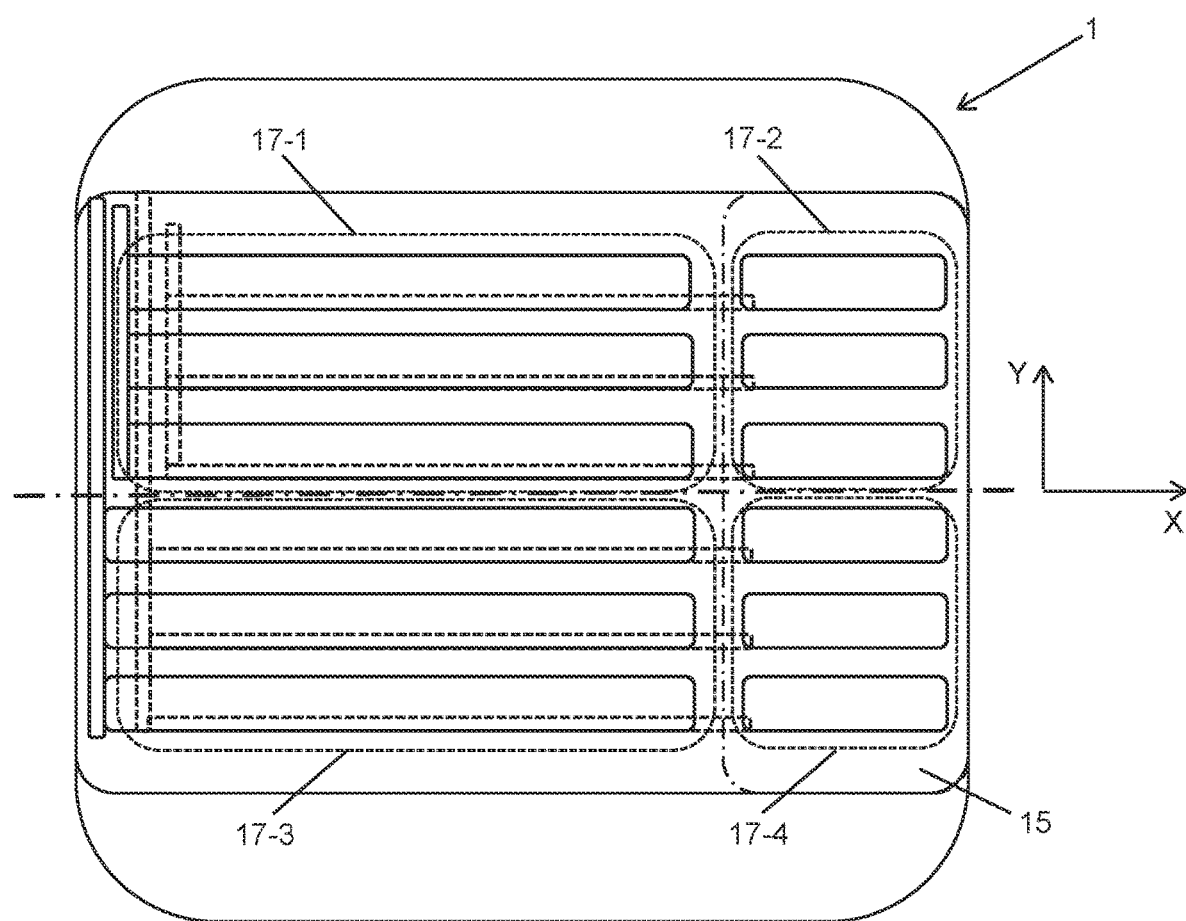
FIG. 12 shows a schematic plan view representation of a seat cushion according to a further embodiment of the present invention.

In a further embodiment shown in FIG. 12, the seat cushion 1 comprises first, second, third and fourth inflatable bladders 17-1, 17-2, 17-3, 17-4. The control system 33 is configured to control the inflation pressure of each of the first, second, third and fourth inflatable bladders 17-1, 17-2, 17-3, 17-4 to provide a pitching hip motion and/or a rolling hip motion. The first and second inflatable bladders 17-1, 17-2 are disposed on a first side of the seat cushion 1; and the third and fourth inflatable bladders 17-3, 17-4 are disposed on a first side of the seat cushion 1. By alternating between inflation of one or more of the inflatable bladders 17-1, 17-2, 17-3, 17-4 on the first and second sides, the control system can induce the rolling hip motion. Alternatively, or in addition, alternating between inflation of one or more of the inflatable bladders 17-1, 17-2, 17-3, 17-4 at the front and back of the seat cushion 1, the control system 2 can induce the pitching hip motion.

By way of example, the control system 33 may be configured to implement a control function comprising first and second operating cycles. The first operating cycle comprises inflating and deflating at least one of the first and second inflatable bladders 17-1, 17-2. The second operating cycle comprises inflating and deflating at least one of the third and fourth inflatable bladders 17-3, 17-4. The control system 33 controls the first and second cycles to induce a cyclical motion about a longitudinal axis X. This cyclical motion may induce a rolling motion of the hips of a seat occupant. Alternatively, or in addition, the control system 33 may be configured to implement a third operating cycle comprising inflating and deflating at least one the first and third inflatable bladders 17-1, 17-3; and a fourth cycle comprising inflating and deflating at least one of the second and fourth inflatable bladders 17-2, 17-4. The control system 33 controls the third and fourth cycles to induce a cyclical motion about a transverse axis Y. This cyclical motion may induce a pitching motion of the hips of a seat occupant.

It will be understood that the seat cushion 1 could be modified to combine the second and fourth inflatable bladders 17-2, 17-4 such that the seat cushion 1 consists of three inflatable bladders 17-1, 17-2, 17-3. In a further variant, the seat cushion 1 may comprise more than four (4) inflatable bladders 17-1, 17-2, 17-3, 17-4. In a further variant, the at least one inflatable bladder 17-$n$ may be disposed in the seating region of the seat cushion 1.

The control system 33 comprises one or more controllers 34. It is to be understood that the or each controller 34 can comprise a control unit or computational device having one or more electronic processors (e.g., a microprocessor, a microcontroller, an application specific integrated circuit (ASIC), etc.), and may comprise a single control unit or computational device, or alternatively different functions of the or each controller 34 may be embodied in, or hosted in, different control units or computational devices. As used herein, the term "controller," "control unit," or "computational device" will be understood to include a single controller, control unit, or computational device, and a plurality of controllers, control units, or computational devices collectively operating to provide the required control functionality. A set of instructions could be provided which, when executed, cause the controller 34 to implement the control techniques described herein (including some or all of the functionality required for the method described herein). The set of instructions could be embedded in said one or more electronic processors of the controller 34; or alternatively, the set of instructions could be provided as software to be executed in the controller 34. A first controller or control unit may be implemented in software run on one or more processors. One or more other controllers or control units may be implemented in software run on one or more processors, optionally the same one or more processors as the first controller or control unit. Other arrangements are also useful.

Figure 13:
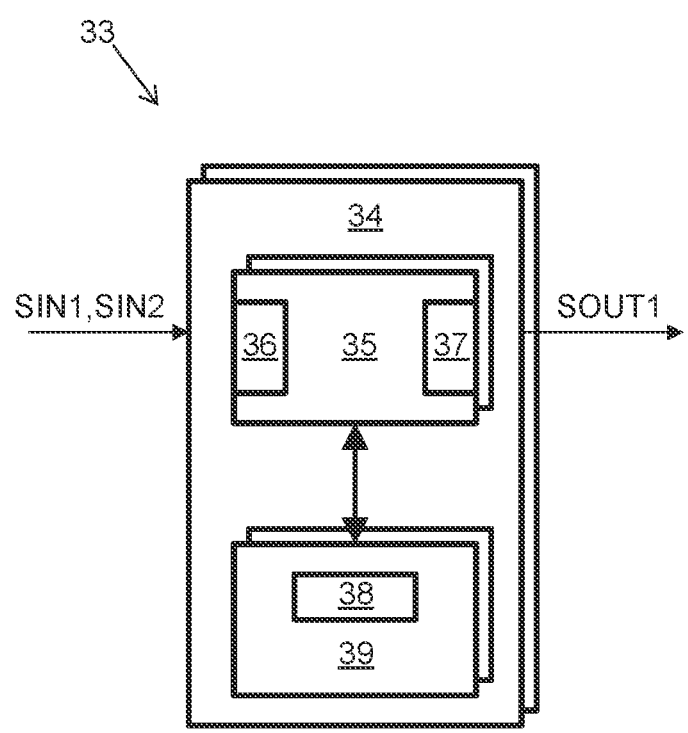
FIG. 13 shows a schematic representation of a controller for controlling inflation and deflation of the one or more inflatable bladders provided in the seat cushion.

In the example illustrated in FIG. 13, the or each controller 34 comprises at least one electronic processor 35 having one or more electrical input(s) 36 for receiving one or more input signals SI N-n and one or more electrical output(s) 37 for outputting one or more output signals SOUT-n. The or each controller 34 further comprises at least one memory device 38 electrically coupled to the at least one electronic processor 35 and having instructions 39 stored therein. The at least one electronic processor 35 is configured to access the at least one memory device 38 and execute the instructions 39 thereon so as to perform the method(s) described herein.

The, or each, electronic processor 35 may comprise any suitable electronic processor (e.g., a microprocessor, a microcontroller, an ASIC, etc.) that is configured to execute electronic instructions. The, or each, electronic memory device 38 may comprise any suitable memory device and may store a variety of data, information 39, threshold value(s), lookup tables or other data structures, and/or instructions therein or thereon. In an embodiment, the memory device 38 has information and instructions for software, firmware, programs, algorithms, scripts, applications, etc. stored therein or thereon that may govern all or part of the methodology described herein. The processor, or each, electronic processor 35 may access the memory device 38 and execute and/or use that or those instructions and information to carry out or perform some or all of the functionality and methodology describe herein.

The at least one memory device 38 may comprise a computer-readable storage medium (e.g. a non-transitory or non-transient storage medium) that may comprise any mechanism for storing information in a form readable by a machine or electronic processors/computational devices, including, without limitation: a magnetic storage medium (e.g. floppy diskette); optical storage medium (e.g. CD-ROM); magneto optical storage medium; read only memory (ROM); random access memory (RAM); erasable programmable memory (e.g. EPROM ad EEPROM); flash memory; or electrical or other types of medium for storing such information/instructions.

Example controllers 34 have been described comprising at least one electronic processor 35 configured to execute electronic instructions stored within at least one memory device 38, which when executed causes the electronic processor(s) 34 to carry out the method as hereinbefore described. However, it is contemplated that the present invention is not limited to being implemented by way of programmable processing devices, and that at least some of, and in some embodiments all of, the functionality and or method steps of the present invention may equally be implemented by way of non-programmable hardware, such as by way of non-programmable ASIC, Boolean logic circuitry, etc.

It will be appreciated that various changes and modifications can be made to the present invention without departing from the scope of the present application. The inflatable bladders 17-$n$ have been described herein as forming part of the same insert 16. It will be understood that more than one inert 16 may be disposed in the compressible member 15. Two or more inserts 16 may be incorporated into the compressible member 15. The inserts 16 may each comprise one or more inflatable bladders 17-$n$.

The seat cushion 1 could be moulded in the mould cavity 51 when the or each inflatable bladder 17-$n$ is inflated. The pre-inflation of the or each inflatable bladder 17-$n$ enables formation of the chamber(s) 21 during the moulding process.

The present invention has been described with particular reference to the first seat cover 11 provided on the seat base 3. It will be understood that the present invention may also be applied to other parts of the seat assembly 2. For example, one or more inflatable bladders may be provided in the seat back 4. The control system 33 may be configured selectively to increase or decrease the inflation pressure in accordance with the method(s) described herein. Sag of the seat cover on the seat back 4 may be reduced. The seat assembly 2 may comprise one or more side bolsters, for example provided on the seat base 3 or the seat back 4. One or more inflatable bladder may be provided in each side bolster. The control system 33 may be configured selectively to increase or decrease the inflation pressure in accordance with the method(s) described herein. Sag of the seat cover on the seat back 4 may be reduced.

As outlined above, the seating assembly 2 in certain embodiments may be selectively configurable in a deployed condition and a stowed condition in the vehicle V. The control system 33 may optionally be configured to detect whether the seating assembly 2 is in the deployed condition or in the stowed condition. The control system 33 can be configured to inhibit increases in the pressure of the one or more inflatable bladders 19-*n* if the seat assembly is in the stowed condition. The control system 33 can be configured to detect a change from a stowed condition to a deployed condition; and/or from a deployed condition to a stowed condition. The control system 33 can be configured to increase the pressure of the one or more inflatable bladders 19-*n* upon detecting a change in the condition of the seat assembly from the stowed condition to the deployed condition. The pressure of the one or more inflatable bladders 19-*n* may be increased once the seat assembly 2 is in the deployed condition or during the re-configuration of the seat assembly 2 to the deployed condition. The control system 33 can be configured to decrease the pressure of the one or more inflatable bladders 19-*n* upon detecting a change in the condition of the seat assembly from the deployed condition to the stowed condition. The pressure of the one or more inflatable bladders 19-*n* may be decreased once the seat assembly 2 is in the stowed condition or as the seat assembly 2 is re-configured to the stowed condition.

The invention claimed is:

1. A control system for controlling inflation of a seat cushion in a seat assembly, wherein the seat cushion comprises one or more inflatable bladders and a seat cushion cover; the control system comprising one or more controllers, the control system being configured to:
    determine an occupancy status of the seat assembly, the occupancy status indicating one of a seat occupied state and a seat unoccupied state;
    monitor the occupancy status to identify a first change from the seat unoccupied state to the seat occupied state;
    in dependence on identification of the first change in the determined occupancy status, generate a decrease pressure signal to decrease the inflation pressure of the one or more inflatable bladders;
    monitor the occupancy status to identify a second change from the seat occupied state to the seat unoccupied state; and
    in dependence on identification of the second change in the determined occupancy status, generate a pressure increase signal to increase the inflation pressure of the one or more inflatable bladders.

2. The control system according to claim 1, configured to identify or predict when the occupant is vacating the seat assembly; and
    in dependence on the identification or prediction, generate a pressure increase signal to increase the inflation pressure of the one or more inflatable bladders.

3. The control system according to claim 2, configured to receive a door opening signal, wherein the door opening signal is indicative of an occupant vacating the seat assembly.

4. The control system according to claim 1, configured to generate an increase pressure signal to increase the inflation of the one or more inflatable bladders in dependence on an activation event.

5. The control system according to claim 4, wherein the seat assembly is installed in a vehicle having a vehicle door, and wherein the activation event comprises one or more of the following: activation of an electronic device associated with the vehicle; the vehicle door being unlocked; the vehicle door being opened; and/or actuation of a handle of the vehicle door.

6. A method of controlling inflation of a seat cushion in a seat assembly, the seat cushion comprising a seat cushion cover and one or more inflatable bladders, the method comprising:
    determining an occupancy status of the seat assembly, the occupancy status indicating one of a seat occupied state and a seat unoccupied state;
    identifying a first change in the occupancy status from the seat unoccupied state to the seat occupied state;
    in dependence on identification of the first change in the occupancy status, decreasing the inflation pressure of the one or more inflatable bladders;
    identifying a second change in the occupancy status from the seat occupied state to the seat unoccupied state; and
    in dependence on identification of the second change in the occupancy status, increasing the inflation pressure of the one or more inflatable bladders.

7. The method according to claim 6, comprising:
    identifying or predicting when the occupant is vacating the seat assembly; and
    in dependence on the identification or prediction, increasing the inflation pressure of the one or more inflatable bladders.

8. The method according to claim 6, comprising increasing the inflation pressure of the one or more inflatable bladders in dependence on an activation event.

9. The method according to claim 8, wherein the seat assembly is installed in a vehicle having a vehicle door, and wherein the activation event comprises one or more of the following: activation of an electronic device associated with the vehicle; the vehicle door being unlocked; the vehicle door being opened; and/or actuation of a handle of the vehicle door.

10. A vehicle comprising the control system according to claim 1.

11. A non-transitory computer-readable medium having stored thereon software that, when executed, is arranged to perform the method of claim 6.

* * * * *